March 16, 1965   H. M. FULDNER ETAL   3,173,315
TURRET DRILL

Filed Sept. 6, 1960   18 Sheets-Sheet 1

INVENTORS
HERBERT M. FULDNER
JOSEPH A. RAVE, JR.

BY
Howard T. Keiser
& John F. Verhoeven
ATTORNEYS

March 16, 1965  H. M. FULDNER ETAL  3,173,315
TURRET DRILL
Filed Sept. 6, 1960  18 Sheets-Sheet 2

Fig. 8.

United States Patent Office 3,173,315
Patented Mar. 16, 1965

3,173,315
TURRET DRILL
Herbert M. Fuldner, Fort Thomas, Ky., and Joseph A. Rave, Jr., Cincinnati, Ohio, assignors to The Cincinnati Milling Machine Company, Cincinnati, Ohio, a corporation of Ohio
Filed Sept. 6, 1960, Ser. No. 57,100
30 Claims. (Cl. 77—32.1)

This invention relates to an automatic turret drill and, more particularly, to a numerically controlled turret drill which will automatically perform various machining operations on a workpiece more quickly and efficiently than has heretofore been possible with known types of indexable turrent drilling machines.

In a preferred embodiment of the invention, the machine is adapted to be controlled from a tape containing information as to the tool to be selected, the type of operation to be performed such as tapping or drilling, the X and Y coordinates of hole location, the depth of the hole being machined, and the spindle speeds and feeds to be employed. This information is set into stores, there being but one store for each item of information. The use of single stores is made possible by arranging the cycle in such a manner that the stores are filled at a time when the information is not needed for the machine function to which it pertains. There is also provided a zero shift or tool length store which includes groups of manual selector switches associated with each of the tools. The switches of each group are preset in accordance with the length of the particular tool with which they are associated. The switches are selected in accordance with the tool being used and automatically introduce the zero shift required to bring all of the tools into the same position relative to the surface of the work. Hence, the hole depth data is absolute in character and is independent of the length of the tool being used.

Movement of the drill head is controlled by a spacer motor which provides accurate velocity control of the slide and permits an accurate ratio to be maintained between the spindle speed and spindle feed so as to permit tapping operations to be performed as well as drilling operations. The spindle feed is also keyed directly to the spindle speed so that variations in the speed of the spindle motor will not affect the speed-to-feed ratio. The pacer motor is connected by a clutch to the input of the servo mechanism which drives the drill head up and down, and a differential handwheel is provided for manually adjusting the head. An error detector measures the difference between the actual position of the head and that dictated by the store and, when the error is reduced to zero, the pacer motor clutch is disengaged and stops the drill head. In this arrangement, the differential handwheel does not affect the throwout point of the clutch which will always occur at the same position for a given numerical value in the store.

Accordingly, it is an object of this invention to provide a numerically controlled turret drill which is capable of machining a plurality of holes in a workpiece in a continuous, automatic cycle of operation.

Another object of the invention is to provide a simplified numerical control system for a turret drill which requires only one information store for each function being controlled.

Another object of the invention is to provide a numerically controlled turret drill having a tool length store which includes a plurality of selector switches which may be manually preset to correspond to the length of the various tools in the turret. Hence, when a tool is selected, the turret will be zero shifted automatically to locate the tool in a predetermined position relative to the workpiece.

Another object of the invention is to provide a numerically controlled turret drill which is capable of drilling holes to a predetermined depth in a workpiece and thereafter tapping the holes to the same or to a different depth in the course of a continuous automatic cycle.

Another object of the invention is to provide a pacer type of servo control for the hydraulic operated slide of a machine tool so as to enable accurate feed rates of the slide to be obtained.

Another object of the invention is to provide a numerically controlled machine tool having a feed rate store whose output is proportional to the speed of a spindle drive motor so that the spindle feed to spindle speed ratio is maintained constant.

Another object of the invention is to provide a hydraulic turret indexing motor of a new and simplified type.

With these and other objects in view, which will become apparent from the following description, the invention includes certain novel features of construction and combinations of parts, the essential elements of which are set forth in the appended claims, a preferred form or embodiment of which will hereinafter be described with reference to the drawings which accompany and form a part of this specification.

In the drawings:

FIG. 3 is a diagrammatic view of the drill head and turret and includes the hydraulic circuit utilized to operate the same.

FIG. 4 is a chart showing the turret positions corresponding to the energization of the control solenoids.

FIG. 8 is a schematic view showing the circuits employed in the digital-to-analogue converter for the tool length stores.

Figure 14A:
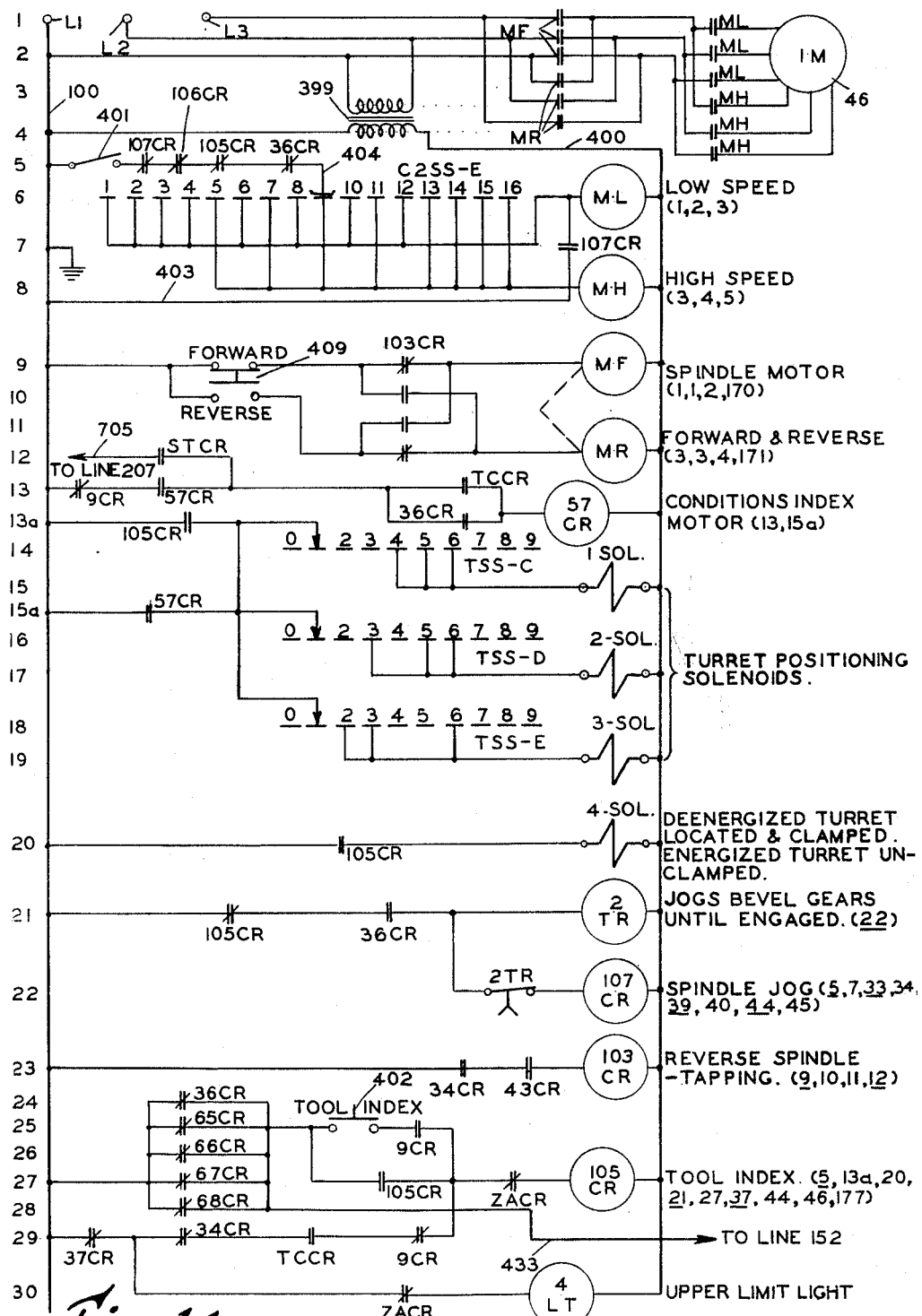
Figure 14B:
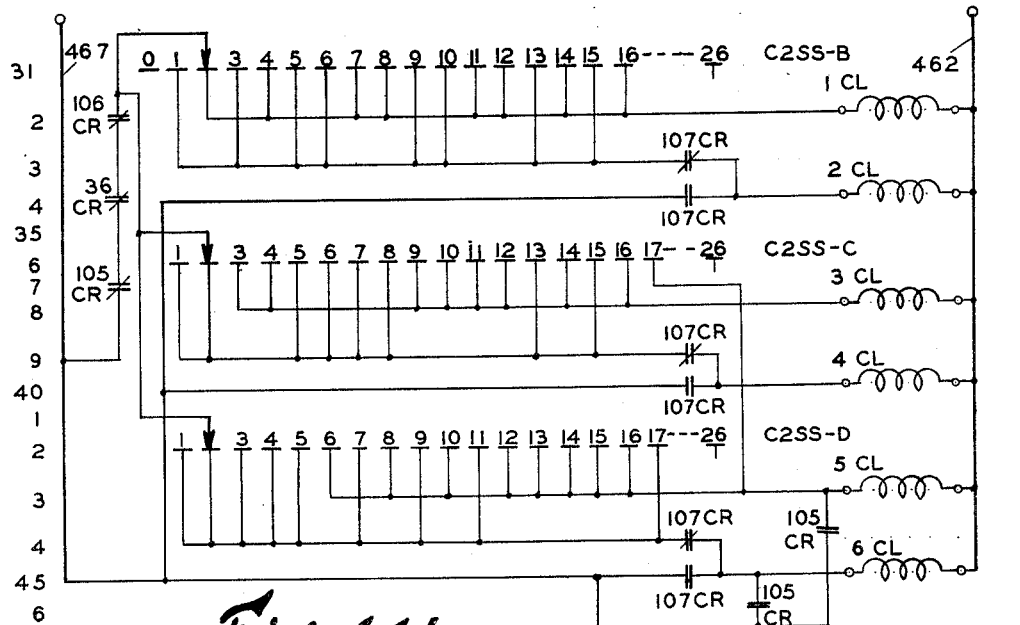
Figure 14C:
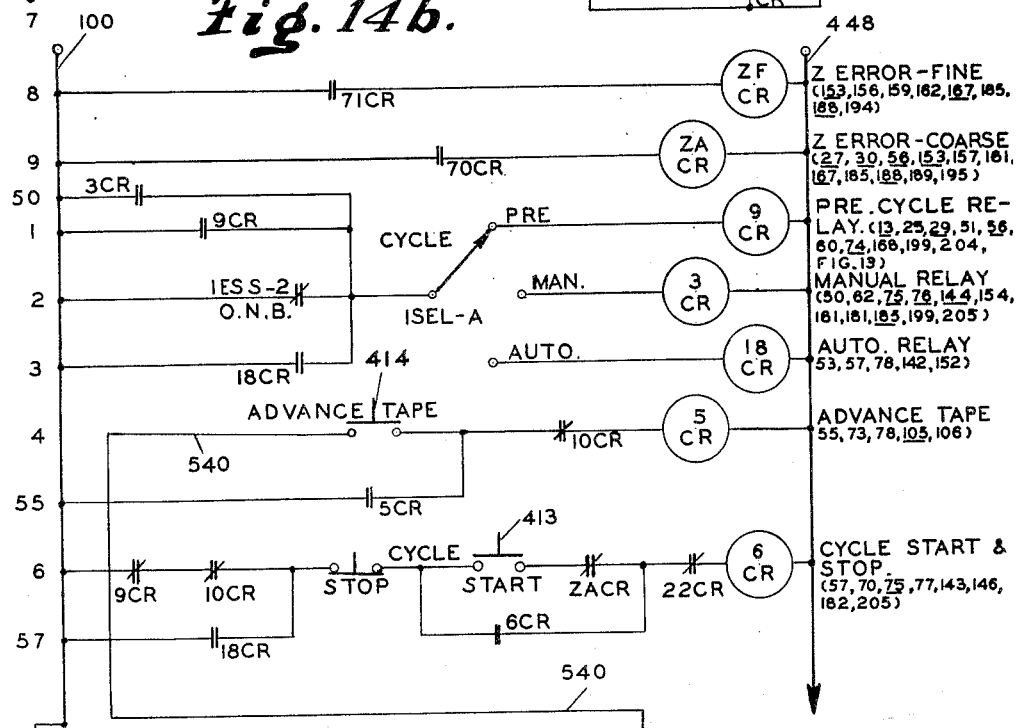
Figure 14D:
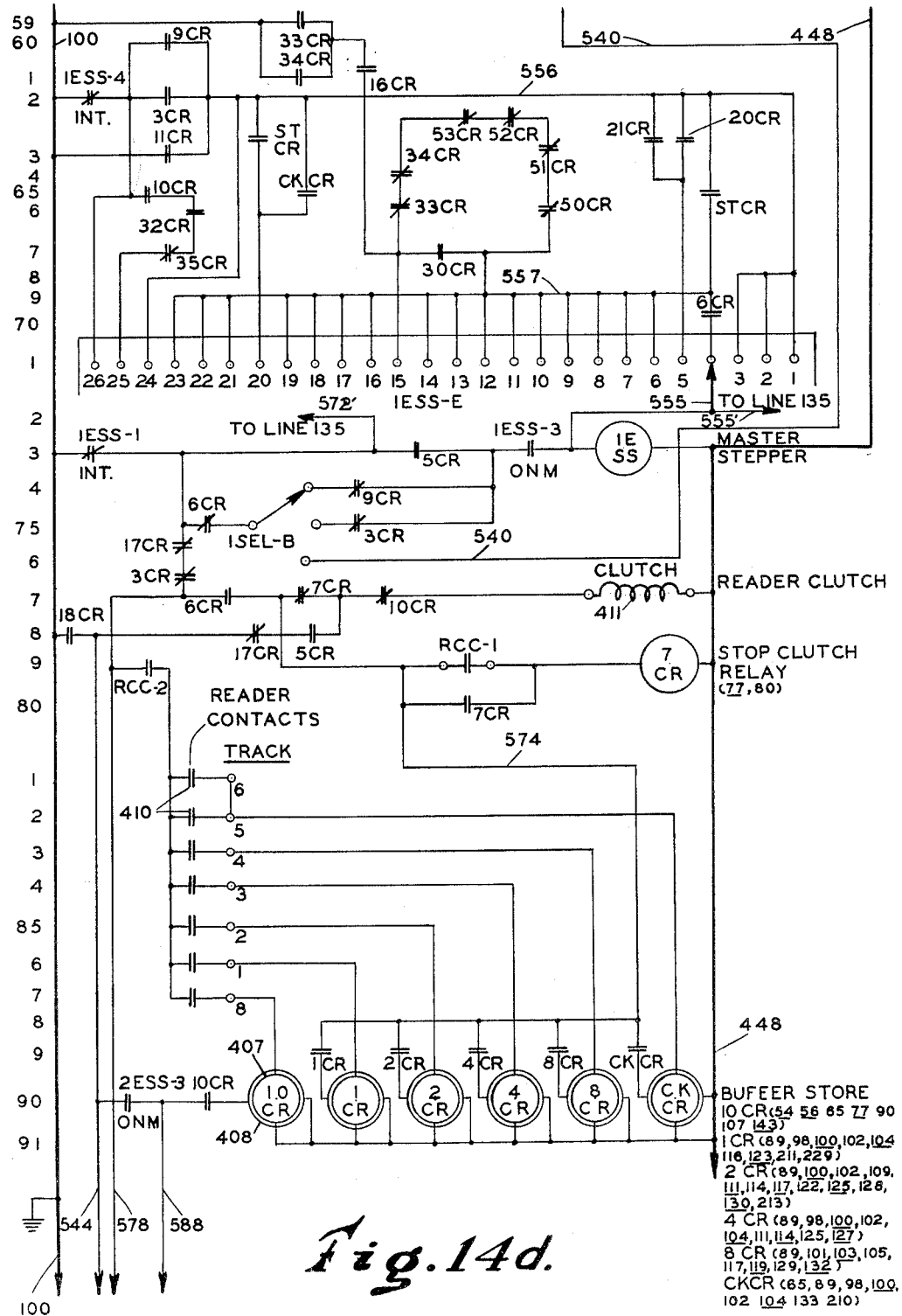
Figure 14E:
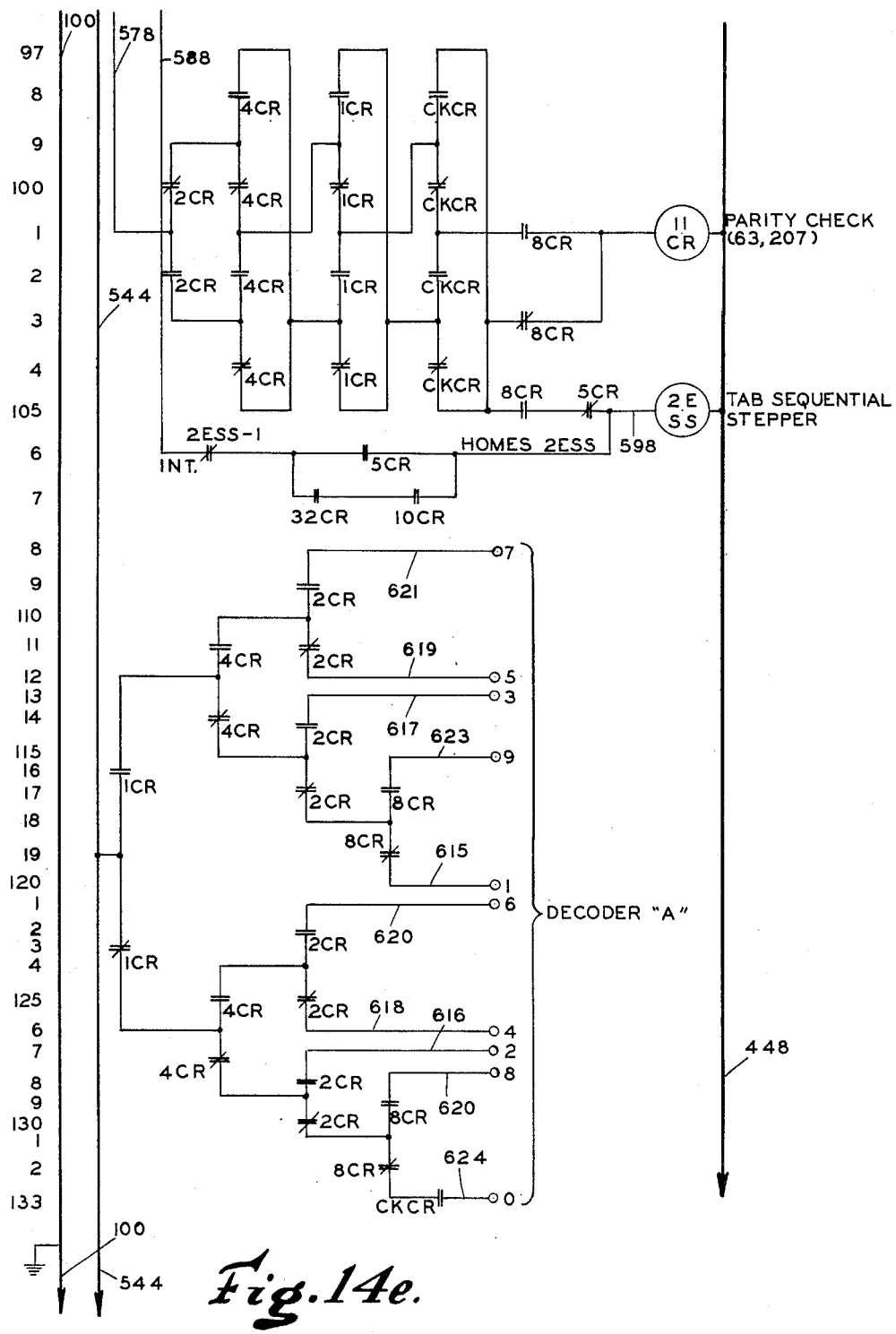
Figure 14F:
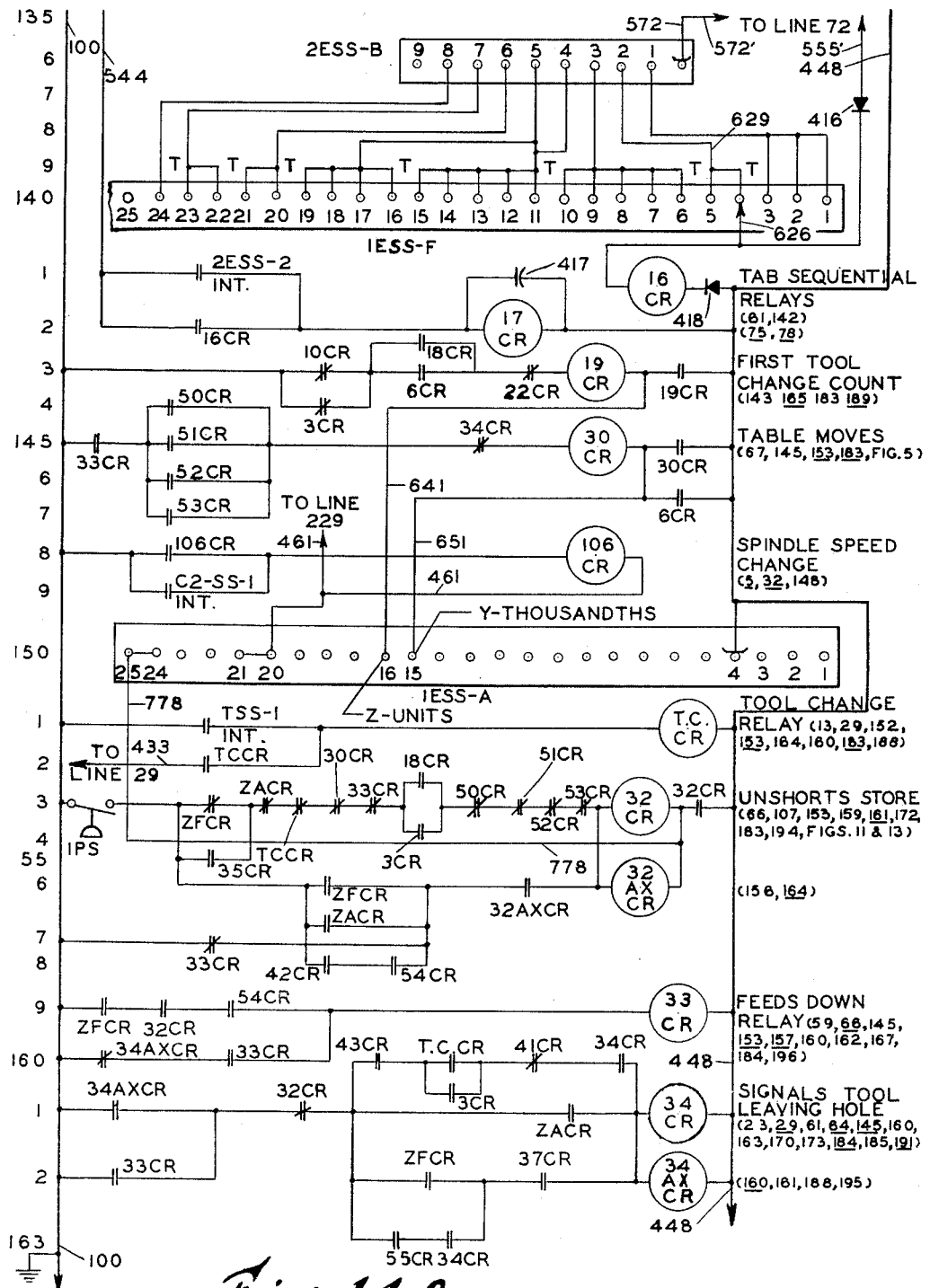
Figure 14G:
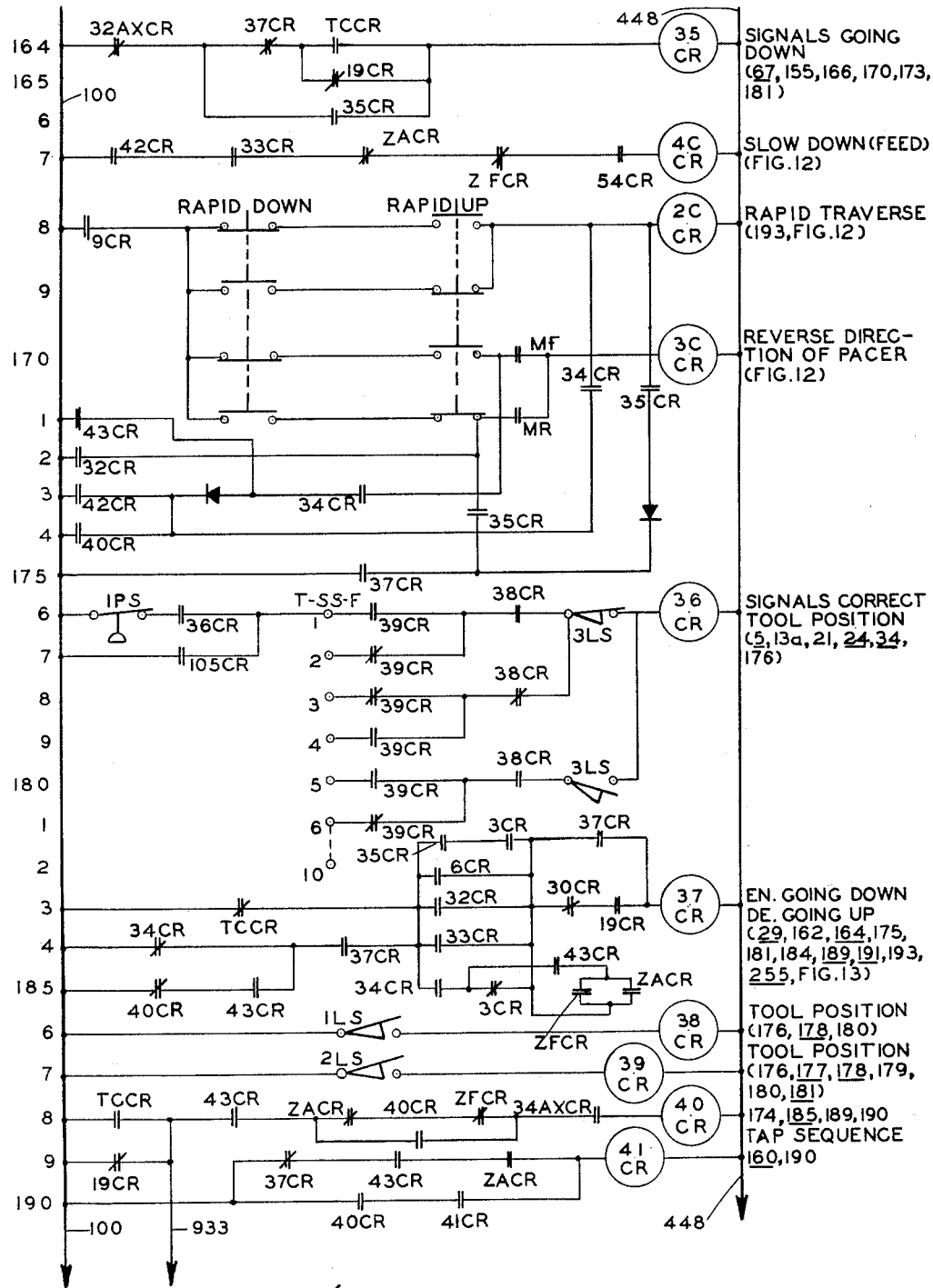
Figure 14H:
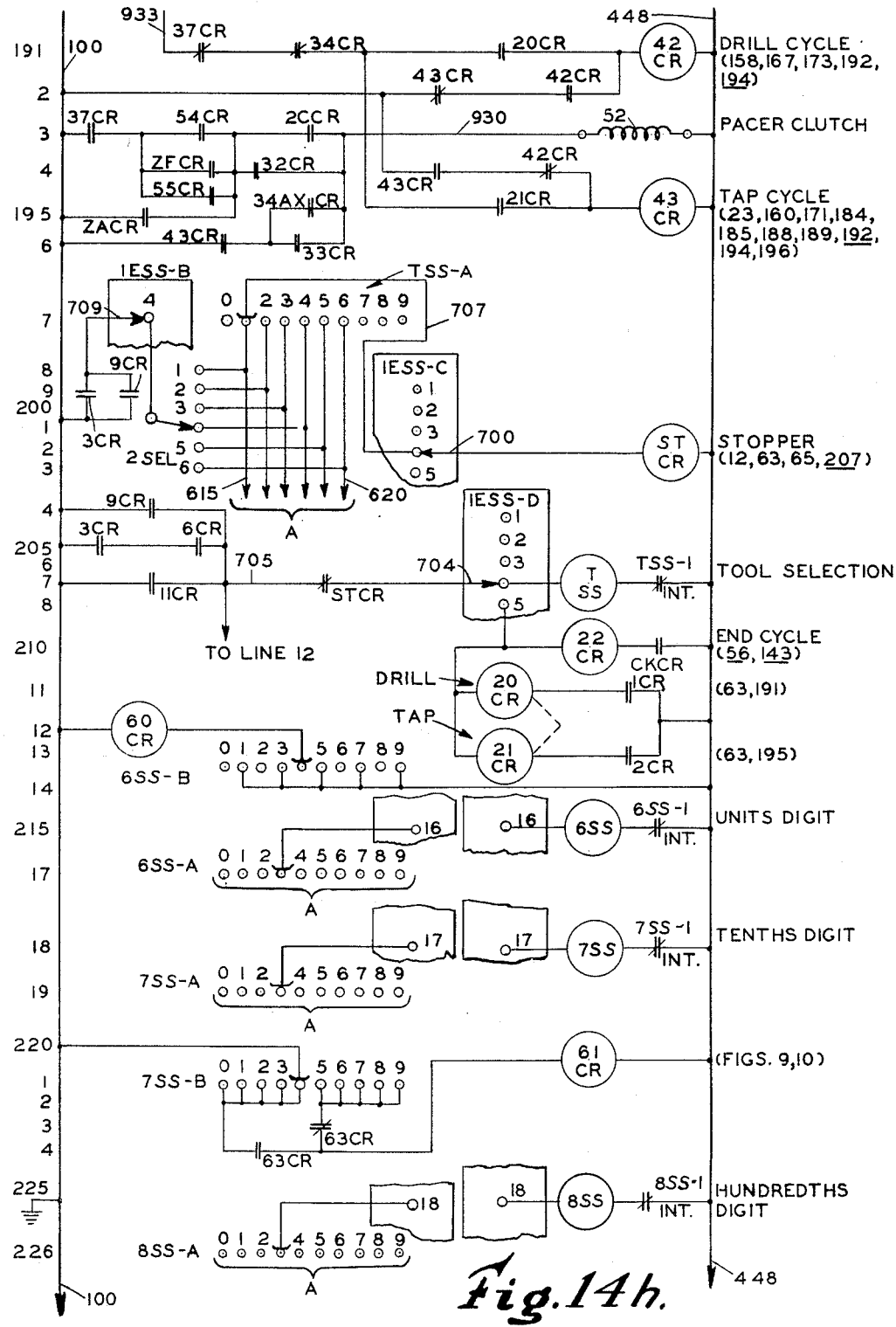
Figure 14:
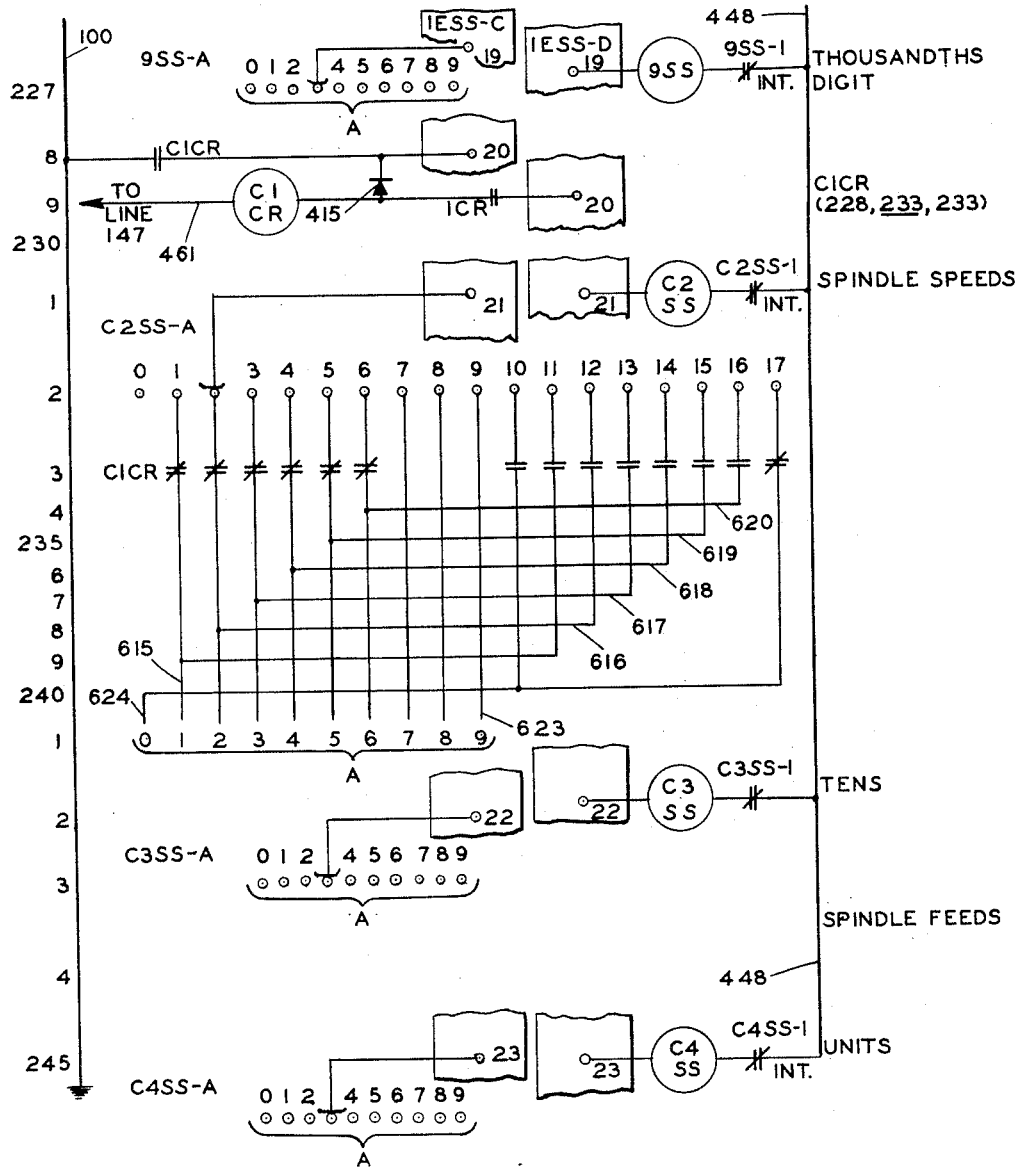
Figure 14K:
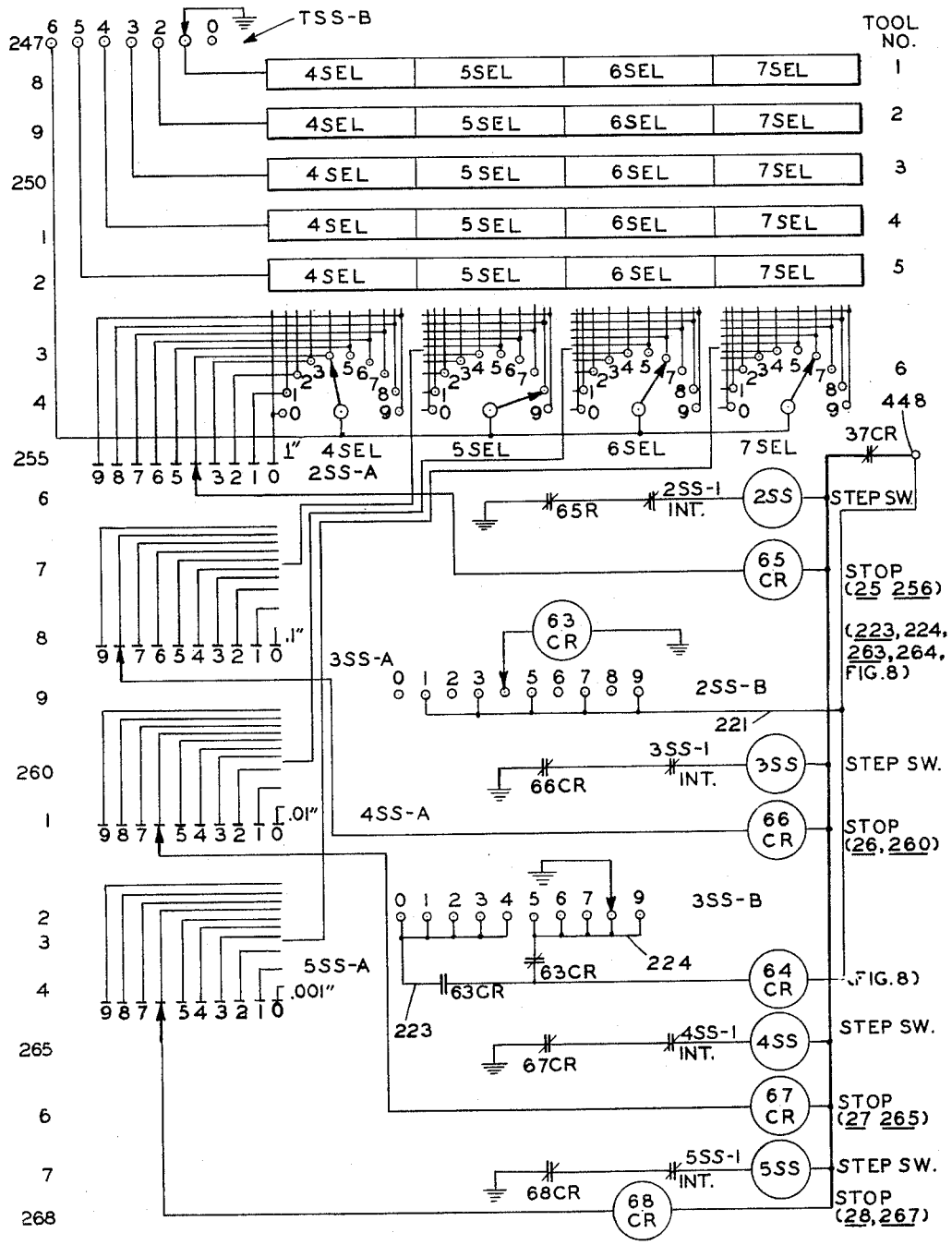

FIGS. 14a–14h, inclusive, and FIGS. 14j and 14k comprise a wiring diagram of the relay and stepping switch circuits of the control system.

Figure 1:
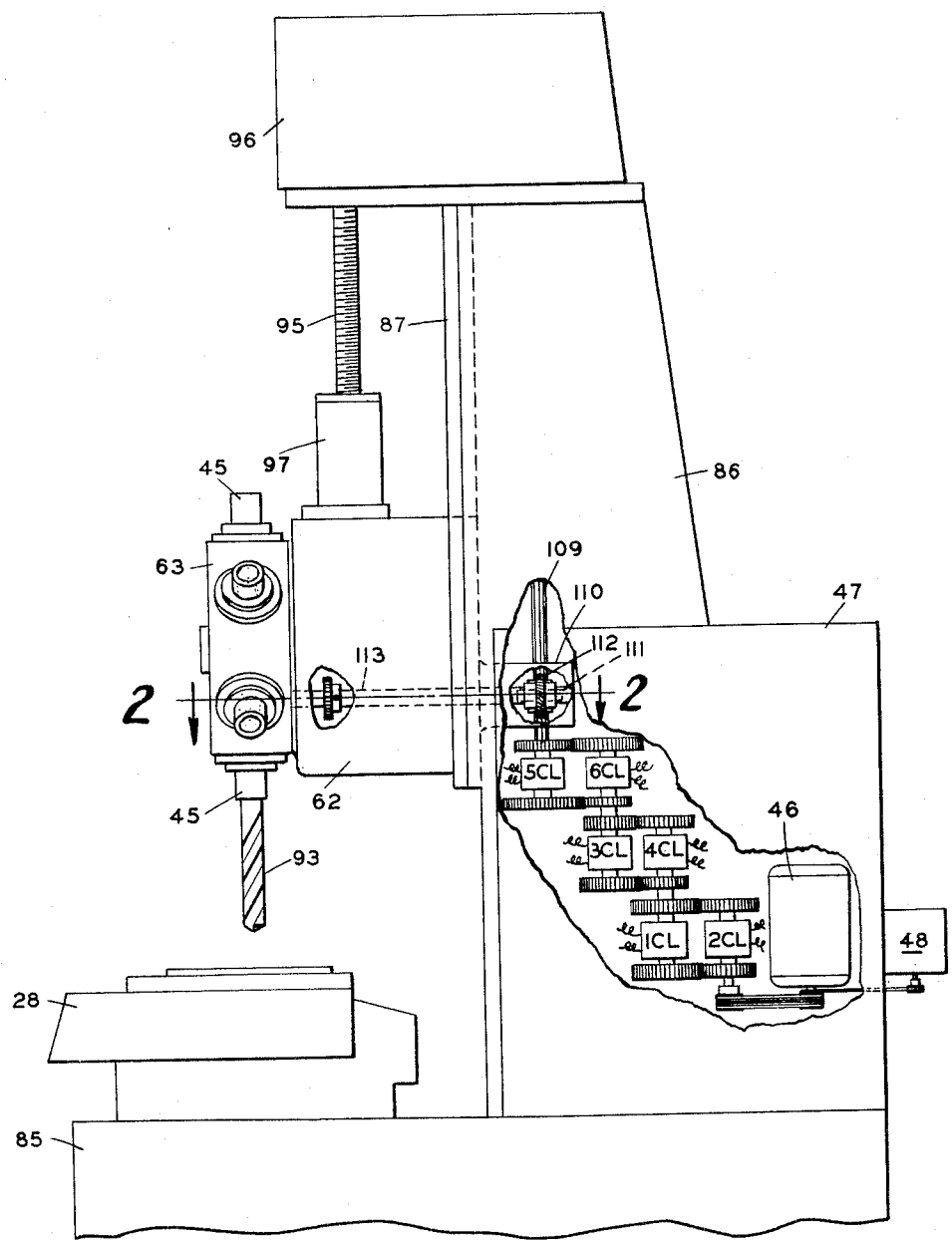
FIG. 1 is a side elevation of a turret drill to which the present invention is shown applied.
Figures 2, 5:
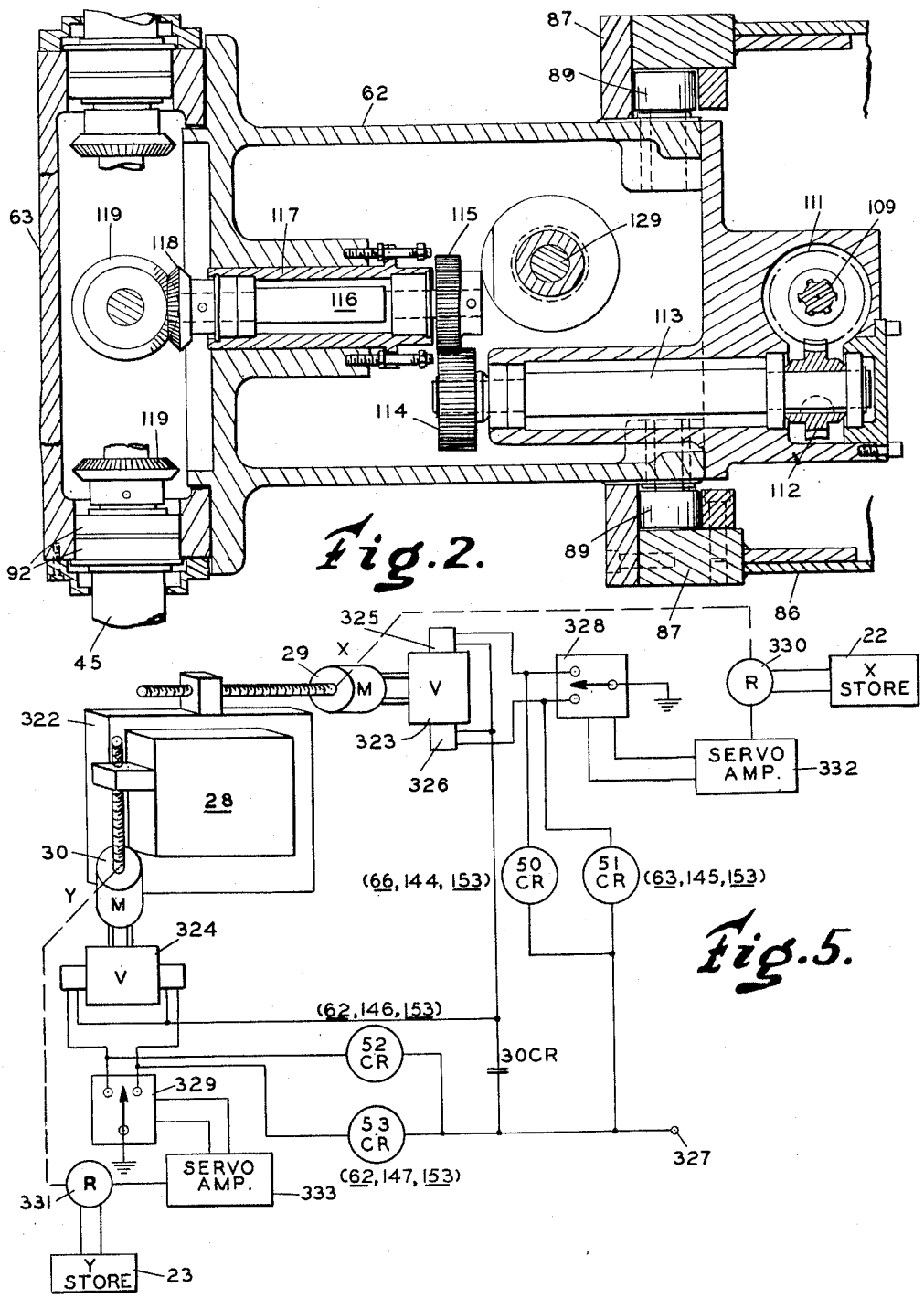
FIG. 2 is a cross-sectional view taken along the line 2—2 in FIG. 1.
FIG. 5 is a schematic view showing the positioning table and the servomechanisms for operating the same.
Figure 6:
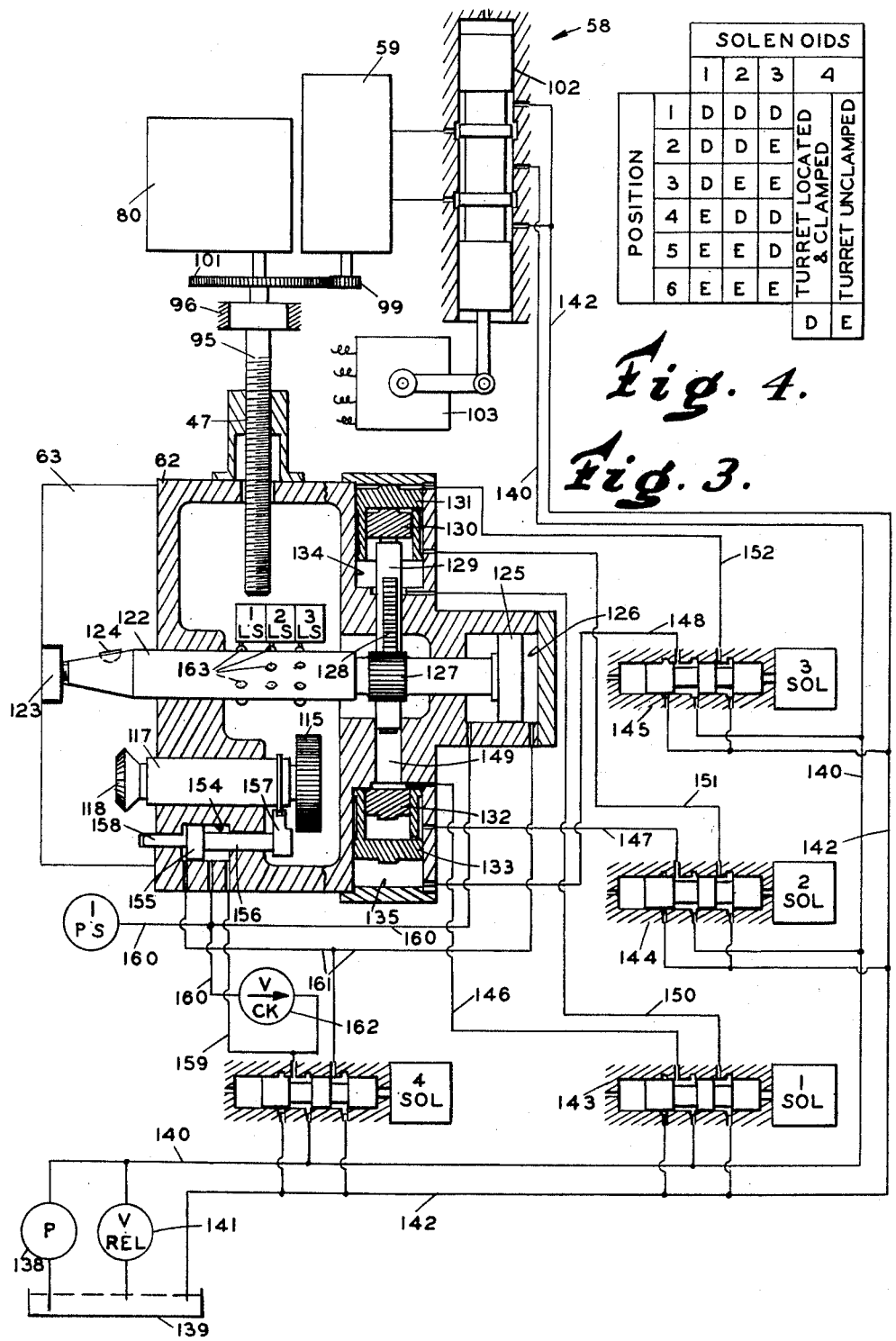
FIG. 6 is a block diagram of a control system as applied to the turret drill of FIGS. 1–3.

The turret drill to which the invention is shown applied is illustrated in FIGS. 1–3 of the drawings, and a block diagram of the complete system is shown in FIG. 6. Considering first the general organization of the system as shown in the block diagram, the input data for controlling the machining operation is furnished by a tape reader 20 to a distributor 21, which controls the sequence in which the information from the tape is fed to an X-axis store 22, a Y-axis store 23, a spindle speed store 24, a feed store 25, a tool selector 26 and a hole depth store 27. The X and Y stores provide positional information for the servomechanisms which adjust the table 28 in accordance with this data and thereby position a workpiece mounted thereon in a preselected coordinate position with respect to the tool. Motors 29 and 30 drive the table along the X and Y coordinates through lead screws 31 and 32 respectively. Feedback information as to the position of the table is supplied through channels 33 and 34 to error detectors 35 and 36 which compare the feedback information with the position information supplied from the stores through channels 37 and 38. The error signals are fed into error amplifiers 39 and 40 which amplify the signals and operate relays used for control purposes.

The drill spindles 45 on turret 63 are arranged to be driven by a motor 46 through a speed-change gear box 47 which is controlled from the spindle speed store 24. By this means, any one of a plurality of different spindle speeds may be selected by appropriate data punched on the tape. The spindle motor drives a tachometer 48 which furnishes energizing potential to the feed store 25. Hence, the output of this store, which is fed to the pacer motor 49, will be proportional to the speed of the spindle motor 46, and thus the feed per revolution will remain constant despite any variations in the spindle speed due to changes in the load on the tool.

The pacer motor drives a tachometer 50 which feeds back a voltage into a differencing circuit 51. This circuit has a second input from the feed store 25, and the difference between these two input voltages is furnished to the pacer motor. Hence, the pacer motor will run at a speed proportional to the input from the feed store 25.

The pacer motor also drives an electromagnetic clutch 52, which, when energized, drives a transmitter 53. The transmitter is electrically connected to a receiver 54 through a differential 55 which is arranged to be operated by a handwheel 56. The receiver 54 forms an electromechanical error detector for a servo loop comprised of a servoamplifier 57, a servovalve 58 and a hydraulic servomotor 59 which feeds back positional information through a mechanical driving connection 60 and 61 to the receiver 54. The motor 59 drives a slide or drillhead 62 which carries the turret 63. Hence, the pacer motor 49 will cause the drill head to move up or down at a feed rate determined by the output of the feed store 25.

The turret is adapted to be indexed by a motor 70 which is controlled by the tool selector 26 for moving one of the six spindles 45 on the turret into operative position. The selector 26 also monitors the tool length stores 71 and activates the group of selector switches pertaining to the tool selected. These switches, which are arranged to be preset manually as indicated by the block 72, control the tool length store analogue converter 74. The output of the converter is fed either directly to the error amplifier 75 through normally closed relay contacts 76 or, by reversing the contacts, the analogue may be serially added to the output of the hole depth store analogue converter 77, and the sum of the two analogs fed to the amplifier 75. A milliammeter 78 is connected to the error amplifier for enabling the stores 71 to be preset by first selecting the tools with the manual control 79, then adjusting each tool to a predetermined height above the workpiece, and finally adjusting the stores 71 for a minimum reading on the meter 78.

The error amplifier 75 receives a second input from the electromechanical feedback unit 80. This input is compared with the input from the stores, and the resultant error voltage, if any, operates a relay which causes disengagement of the clutch 52 when the voltage drops to zero. For finer control, the output of the error amplifier 75 is fed through a phase-sensitive rectifier 81 which controls a Micropositioner 82. The contacts of the Micropositioner are, in turn, used to control relays (not shown) which control the deenergization of the clutch 52 when the error is reduced to zero.

*Machine tool*

The turret drill shown in FIGS. 1 to 4, inclusive, has a frame comprised of a base 85 (FIG. 1) on which is supported a column 86. The forward face of the column is provided with a pair of vertically extending ways 87 (see also FIG. 2) on which the drill head 62 is supported by rolls 89 for movement in a vertical direction. The drill head carries the turret 63 which is supported on the head for rotation about a horizontal axis. In the present embodiment of the invention, the turret is fitted with six radially extending spindles 45. The spindles are journaled in bearings 92 (FIG. 2) fitted in apertures in the turret, and each is adapted to hold a drill 93 or other suitable tool therein. Located beneath the turret 63 on the base 85 is the table 28 which is adapted to support the piece of work being machined. In the present embodiment, this table is adjusted in two mutually perpendicular directions in a horizontal plane as indicated in FIG. 5. These directions are hereinafter referred to as the X-axis and Y-axis, while the vertical adjustment of the head is referred to as the Z-axis. The head is arranged to be moved along the ways 87 by a feed screw 95 which is supported for rotation only in a housing 96 secured to the upper end of the column 86. The screw meshes with a nut 97 secured to the drill head so that when the screw is rotated, the head will be moved up or down along the ways. Rotation of the screw is effected by the hydraulic motor 59 (FIG. 3) driving a pinion 99 which meshes with a gear 101 secured to the upper end of the screw. The motor is controlled by the servovalve 58 consisting of a piston type valve 102 and an electric torque motor 103 for operating the valve. The motor and valve are situated within the housing 96 as is also the feedback unit 80 which is drivingly connected to the upper end of the screw 95.

The drive for the spindle 45 is provided by motor 46 which drives a splined shaft 109 journaled in the column 86 through electromagnetic clutches 1CL to 6CL. These clutches may, for example, be of the "MDO" type manufactured and sold by Warner Electric Brake & Clutch Co. of Beloit, Wisconsin. These are single acting, multiple disc clutches in which a stationary field coil, when energized, causes a set of outer discs keyed to a driving cup to be pressed into engagement with a set of inner discs, keyed to a driven cone thereby coupling the cup to the cone. When the field coil is deenergized, a return spring separates the disc and disengages the cup from the cone. By virtue of the different gear ratios employed in the drive train, it is possible, by energizing the clutches in various combinations, to obtain a considerable range of spindle speeds. Additionally, as will be explained later, the motor 46 is wired to operate at two different speeds so that a high range of spindle speeds may be obtained and also a low range. The motor 46 also has a direct driving connection to the tachometer 48 which provides an A.C. output that is utilized in a manner to be more fully explained hereinafter.

The drill head has secured thereto a gear casing 110 within which is situated a helical gear 111 slidable along the splined shaft 109 while being rotated therewith. The gear 111 meshes with a companion gear 112 in the casing 110, which latter gear is fastened to a shaft 113 journaled in the head. At its forward end, the shaft has fixed thereto a gear 114 (FIG. 2) which meshes with a gear 115 attached to the rear end of a shaft 116 journaled in a sleeve 117 which is slidable in the head. The forward end of this shaft projects into the turret where it is fitted with a bevel gear 118. Inside of the turret each spindle 45 has secured thereto a bevel gear 119 with which the gear 118 is adapted to mesh when the spindle is brought into operative position.

The turret is arranged to be indexed from any position to any other position under the control of solenoid operated valves as shown in FIG. 3. It will be noted that the turret is provided with a tapered socket which receives the tapered end of a shaft 122 which is journaled in the drill head 62. The turret is drawn snugly onto the end of the shaft by a nut 123 and is held against rotation thereon by a key 124. At its rear end the shaft is fitted with a clamping piston 125 which works in a cylinder 126 attached to the frame of the drill head. The shaft also has secured thereto an elongated pinion 127 which meshes with a rack 128 carried by a plunger 129 which forms part of the hydraulic motor 70 for indexing the turret. Cooperating with each end of the plunger are operating pistons 130, 131, 132 and 133, which are received in cylinders 134 and 135. The pistons 131 and 133 are bored to provide cylinders into which the smaller pistons 130 and 132 are fitted.

Pressure for operating the pistons is provided by a pump 138 which draws fluid from a reservoir 139 and supplies it to a pump line 140 at a pressure determined by the setting of a relief valve 141. Exhaust fluid from the motor and other parts of the system is returned to the reservoir through a line 142. The flow of pressure fluid from the line 140 to the indexing pistons is controlled by valves 143, 144 and 145 which are operated by solenoids 1SOL, 2SOL, and 3SOL, respectively. In FIG. 3, the valves are shown in the positions they occupy when the solenoids are deenergized. When the solenoids are energized, the valves are moved toward the left as viewed in this figure. The chart in FIG. 4 indicates which solenoids must be energized (E) and which must be deenergized (D) for each position of the turret. When all three solenoids are deenergized as shown in FIG. 3, the turret is moved to bring the #1 spindle 45 and its associated tool into operative position as, for example, the drill 93 shown in FIG. 1. With the valves 143, 144 and 145 in the positions shown, fluid under pressure will be supplied to motor lines 146, 147 and 148. Pressure in line 148 will move the large piston 133 up until it bottoms against the upper end of cylinder 135. This will, of course, carry the smaller piston 132 along with it. Pressure in the line 147 will flow into an elongated annular groove formed in the piston 133 and thence through a port in the piston into the interior thereof. Thus, fluid will enter the cylinder in which piston 132 is fitted and will move this piston up until it too bottoms on the end of the cylinder 135. Pressure supplied through line 146 to a cylinder 149 in which the plunger 129 works will force the plunger upward to the position shown. It will be observed that when pressure is connected to motor lines 146, 147 and 148, the other group of motor lines 150, 151, and 152 will be connected to reservoir through line 142. Hence, the upper pistons 130 and 131 will collapse under the upward thrust of the plunger 129. This is the first position of the turret.

When solenoid 3SOL is energized, pressure in line 152 will force piston 131 down in the cylinder 134, and piston 133 will be released and permitted to move down to the bottom of cylinder 135. This is the second position of the turret in which spindle #2 is moved into operative position. When solenoid 2SOL is also energized, pressure in line 151 will force the piston 130 down, and piston 132 will be released and permitted to move down in piston 133. This is the third position of the turret, in which spindle #3 is moved into operative position. When solenoid 1SOL is energized, and solenoids 2SOL and 3SOL are deenergized, pressure in cylinder 149 will be released, and pressure will be applied to the upper end of the plunger. This will force the bottom end of the plunger against the piston 132 which will be held in the position shown in FIG. 3 by the pressure in lines 147 and 148. This is the fourth position of the turret in which spindle #4 is moved into operative position. When solenoids 1SOL and 2SOL are energized, and solenoid 3SOL is deenergized, pressure will be applied to the upper end of plunger 129 and to the piston 130 through lines 150 and 151. Also, piston 132 will be released while piston 130 will be forced down. Pistons 131 and 133 will assume the positions shown in FIG. 3, which is the fifth position of the turret with spindle #5 moved into operative position. When all three solenoids are energized, pressure in lines 150, 151 and 152 will apply pressure to pistons 130 and 131 and to the top of plunger 129. This will cause pistons 132 and 133 to collapse, and the plunger will assume its lowermost position, which is just the reverse of the position shown in FIG. 3. This is the sixth position of the turret in which spindle #6 is moved into operative position.

Before the turret can be indexed, it must be unclamped and the bevel gear 118 withdrawn from engagement with the gear 119 on the spindle. The engagement and disengagement of the bevel gears is effected by a piston 155 which works in a cylinder 154 in the drill head. The piston is attached to a piston rod 156 which carries a shifting fork 157 for moving the sleeve 117 and gear 118 back and forth in the head. The piston also operates a locating pin 158 which seats in a recess formed in the turret to insure proper alignment of the turret in each position to which it is moved.

When solenoid 4SOL is deenergized, as shown in FIG. 3, pressure from line 140 is communicated by a line 159 to the rear of the piston 155. This maintains the bevel gear and locating pin in their forward positions. Pressure from the cylinder 154 is also communicated by an intermediate port therein to a line 160 which is connected to a pressure switch 1PS and also to the forward face of the clamping piston 125. This will draw the shaft 122 rearwardly and clamp the turret against the drill head. When solenoid 4SOL is energized, pressure from line 140 will be delivered through a line 161 to the rear face of piston 125 to unclamp the turret and the forward end of cylinder 154 to disengage the bevel gear and locating pin. Pressure will also be cut off from line 160, and the latter will be connected through a check valve 162 to the reservoir line 142. This will release pressure from the pressure switch 1PS for a purpose which will be fully explained hereinafter.

In order to verify correct positioning of the turret 90 in accordance with information supplied from the tape, the shaft 122 on which the turret is mounted is provided with a group of protuberances 163. These protuberances are adapted to operate limit switches 1LS, 2LS, and 3LS situated within the head 62 as shown in FIG. 3. By utilizing different combinations of protuberances 163 in each of the six positions of the turret, it is possible to determine from the condition of the limit switches whether the turret is in the position called for by the tape. More will be said about this feature of the control system in connection with the relay circuits which will hereinafter be described.

*Positioning control circuits*

In the description to follow, only the Z-axis stores and converters will be described in detail inasmuch as the X- and Y-axis stores may be of similar construction, and any description thereof would be merely repetitive in character.

*Tool length store*

Figure 8:
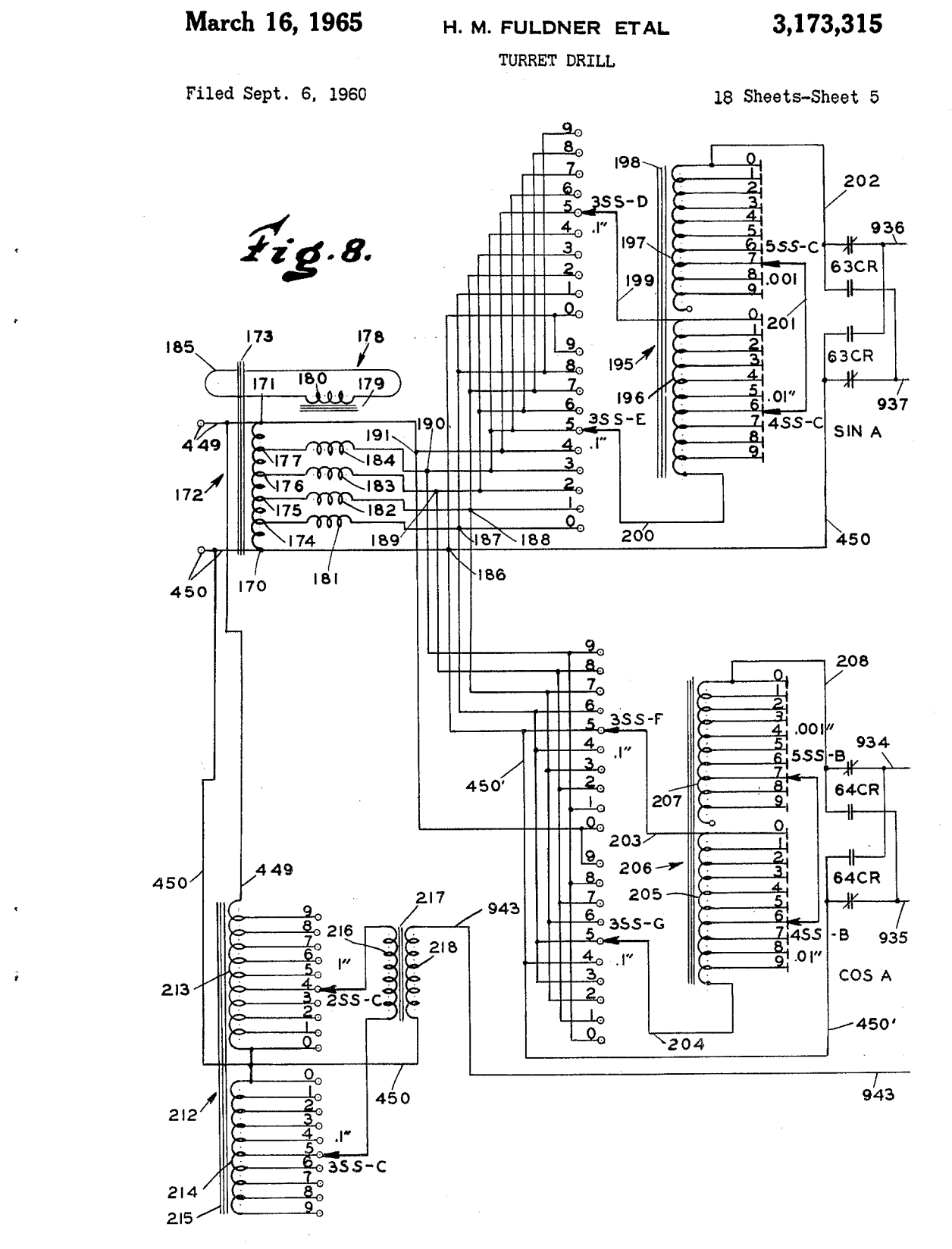
Figure 9:
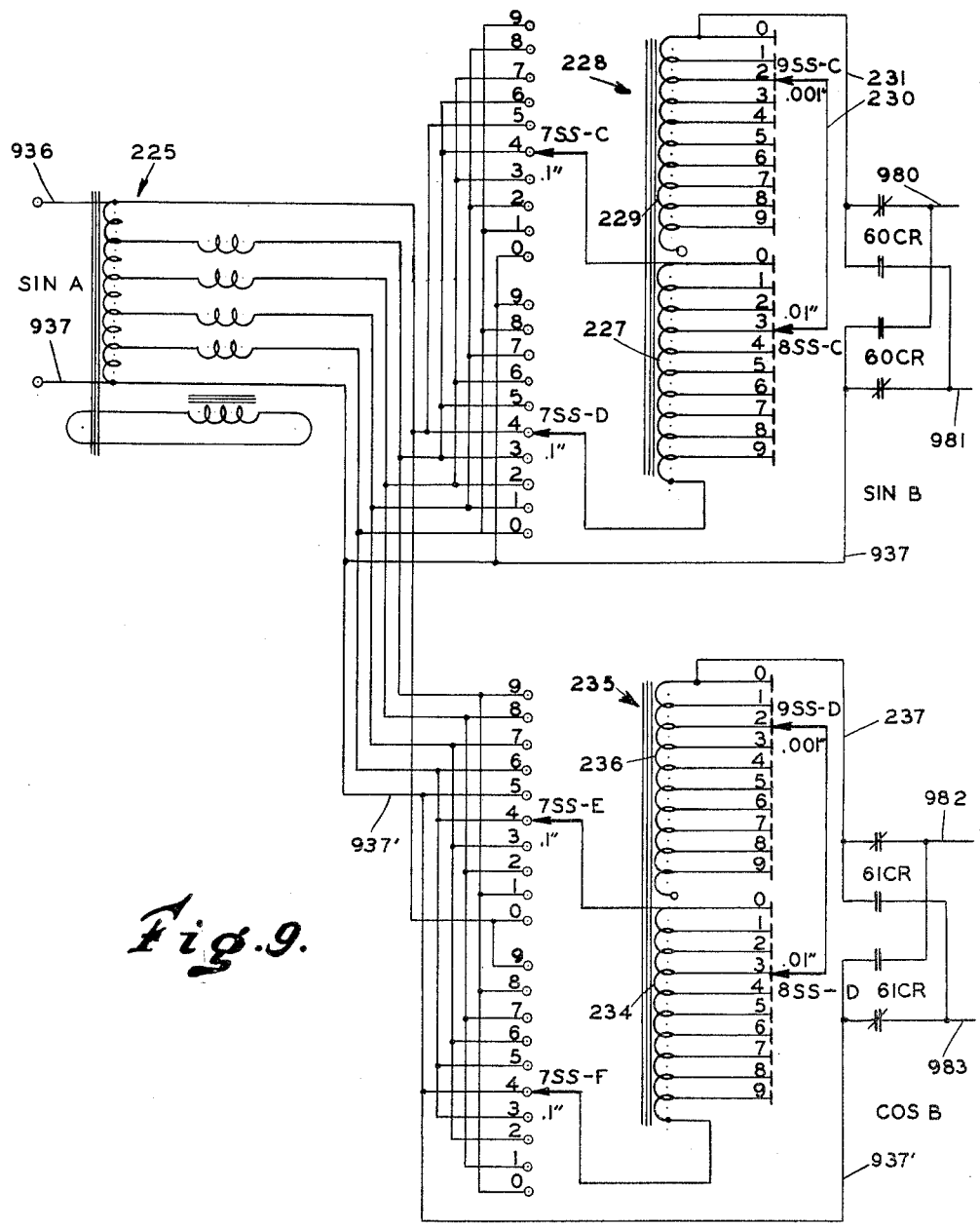
FIGS. 9–11 are schematic views of the circuits employed in conjunction with the hole depth store.
Figure 10:
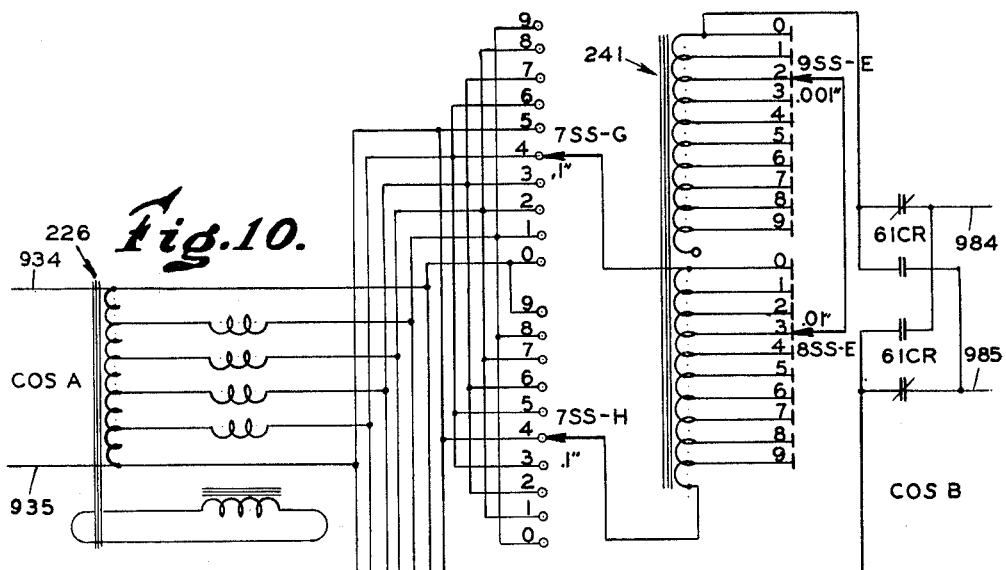

The digital-to-analog converter for the tool length store is shown in detail in FIG. 8 and is of the trigonometric type as is also the converter for the hole depth store shown in FIGS. 9 and 10. In other words, in these stores, the digital input information is converted into angular analog data such as sine and cosine voltages which may thereafter be applied to the quadrature windings of a trigonometric type error detector. Since the hole depth data must be added to the tool length data in order to determine the bottom of the hole being machined, it is necessary to add the angular data from the stores in accordance with the well known formulas for adding the trigonometric functions of angles. Thus $$\sin(A+B) = \sin A \cos B + \cos A \sin B$$

and $$\cos(A+B) = \cos A \cos B - \sin A \sin B$$

Also, since the sine and cosine functions are derived only for angles from 0° to 90°, it is necessary to determine the sign of the function in accordance with the quadrant in which it lies. The manner in which the adding of the functions and the determination of the signs thereof is accomplished will be set forth in the following description.

In the case of the tool length store shown in FIG. 8, an A.C. reference voltage is applied to terminals 449 and 450 which are connected by similarly numbered conductors to the end terminals 170 and 171 of a tapped autotransformer 172. Since, in the present apparatus, the autotransformer is required to serve as a low-impedance, precision voltage divider, it is preferably a toroidal transformer designed for minimum flux leakage between turns. As shown, the transformer is wound on an annular core 173 and is provided with four taps 174, 175, 176 and 177 which are appropriately spaced to provide voltages which are proportional to the sine and cosine of 0°, 18°, 36°, 54°, 72° and 90°, the sine of 0° being equal to the cosine of 90°, the sine of 18° being equal to the cosine of 72°, the sine of 36° being equal to the cosine of 54°, the sine of 54° being equal to the cosine 36°, and the sine of 72° being equal to the cosine of 18°.

In order to obtain the desired degree of accuracy of the sine and cosine voltages required without using a transformer having a very large number of turns, there has been employed a second toroidal transformer 178 having an annular core 179 on which is wound a primary winding 180 and four secondary windings 181, 182, 183 and 184. The secondary windings are inserted in the leads from taps 174, 175, 176 and 177 and thereby act to insert correcting voltages which either add to or subtract from the voltages provided by the taps. To maintain the proper phase relation between the injected voltages and the voltages from the taps, and also to maintain the proper amount of voltage injection regardless of variation in the supply voltage, the primary winding 180 is excited from a winding 185 wound on the core 173 of the auto transformer.

It will thus be seen that when the terminals 449 and 450 are energized from a source of reference voltage, terminals 186, 187, 188, 189, 190 and 191 will be supplied with voltages which are proportional to the values of the sine of 0°, 18°, 36°, 54°, 72°, and 90,° and to the cosine of 90°, 72°, 54°, 36°, 18°, and 0°, respectively.

Assuming that the feedback unit 80 (FIG. 6) connected to the drill head 62 is one which is subject to angular displacement, for example, a resolver, and that two inches of movement of the slide 62 along the Z-axis produces one revolution or 360° rotation of the resolver, then each 18° of displacement of the unit will equal 0.1 of an inch of movement of the slide. Thus, the 18° division of the taps 186–191 each represent 0.1 of an inch of slide movement. Since, in the present apparatus it is desired that the slide movement be controlled to within .001 of an inch, it is necessary to further resolve the 18° steps into 1.8° and .18° to represent .01 inch and .001 inch, respectively. This is accomplished by another toroidal transformer 195 provided with two windings 196 and 197 both wound on an annular core 198. Both windings are linearly tapped to provide ten equal voltages, the voltages of the two windings being related in the ratio of 10:1. In other words, the voltage between taps on the winding 196 is ten times as great as the voltage between taps on the winding 197. This is for the purpose of enabling the voltage between adjacent taps 186–191 to be divided into ten equal parts by winding 196 with each of these divisions then being further divided into ten equal parts by the winding 197.

The means for connecting the taps in the proper order to provide the desired resolution of voltages comprises three multi-bank stepping switches 3SS, 4SS and 5SS. The individual contact banks of these switches are designated by letter suffixes such as B, C, D, E, etc.

As herein illustrated, the switch bank 3SS–D has ten contacts numbered 0–9, inclusive, which contacts are connected to the terminals 186, 187, 188, 189, 190, 191, 190, 189, 188, and 187, respectively. These terminals provide voltages which are proportional to the sine of 0°, 18°, 36°, 54°, 72°, 90°, 108°, 126°, 144°, and 162°, respectively. The switch bank 3SS–E has its contacts 0–9 connected to terminals 187, 188, 189, 190, 191, 190, 189, 188, 187, and 186, respectively, which are in turn provided with voltages proportional to the sine of 18°, 36°, 54°, 72°, 90°, 108°, 126°, 144°, 162°, and 180°, respectively. The linearly spaced taps of winding 196 of transformer 195 are connected to contacts 0–9 of bank C of switch 4SS, while the taps of winding 197 are connected to contacts 0–9 of bank C of switch 5SS. The wiper of switch bank 3SS–D is connected by a wire 199 to the end of winding 196 which is connected to the 0 contact of bank 4SS–C. The wiper of switch bank 3SS–E is connected by a wire 200 to the other end of winding 196. Hence, when the wipers of switch 3SS are on their 0″ contacts, the upper end of winding 196 will be connected to terminal 186 while the lower end of the winding will be connected to terminal 187. Therefore, a voltage proportional to the value of sine 18°, will be impressed across the winding 196 and any number of tenths of this voltage from 0 to .9 may be selected by switch 4SS. The wiper of bank 4SS–C is connected by a wire 201 to the wiper of bank 5SS–C. Thereby, any number of hundredths of the voltage difference between terminals 186 and 187 from 0 to .09 may be added to the voltage picked off by the wiper of bank 4SS–C and delivered to an output conductor 202. For a slide movement of .567 inch, as indicated by the location of the wipers on the stepping switches, the wipers would provide between conductor 450 and output conductor 202 a voltage which is approximately proportional to the value of sine 102.06° (90+10.8+1.26).

The approximate value of cosine 102.06 is derived in a similar fashion from the voltages provided at the terminals 186–191, the contacts 0–9 of a switch bank 3SS–F being connected to terminals 191, 190, 189, 188, 187, 186, 187, 188, 189, and 190, respectively. These terminals provide voltages proportional to the cosine of 0°, 18°, 36°, 54°, 72°, 90°, 108°, 126°, 144°, and 162°, respectively. The contacts 0–9 of switchc bank 3SS–G are connected to terminals 190, 189, 188, 187, 186, 187, 188, 189, 190 and 191 which provide voltages proportional to the cosine of 18°, 36°, 54°, 72°, 90°, 108°, 126°, 144°, 162° and 180°, respectively. The voltage difference between the wipers of these two banks of contacts is applied by wires 203 and 204 to the upper and lower ends, respectively, of a winding 205 on a transformer 206 which may be identical to the transformer 195. Like the latter transformer, the transformer 206 has a second winding 207 which has only one tenth as many turns as the winding 205. Both windings are linearly tapped to provide decimally related voltages, the taps on winding 205 being connected to the 0–9 contacts of a stepping switch bank 4SS–B while the taps of winding 207 are connected to the contacts of a stepping switch bank 5SS–B. The output voltage is derived from a conductor 208 and provides, relative to the conductor 450′, a voltage which is approximately proportional to the value of cosine 102.06 for the wiper settings indicated.

While the linear interpolation of the .01 inch and .001 inch values effected by the transformer windings 196, 205 and 197, 207 is, of course, only an approximation of the true sine and cosine values of the 1.8° and .18° angular increments, it has been found that when the sine and cosine values thus produced are supplied to the quadrature windings of a trigonometric type error detector, such as a resolver, sufficiently accurate results are obtained to position the slide with an accuracy of better than .001 of an inch.

In addition to the above described trigonometric store which serves as the fine control channel for the tool length store, there is also provided a linear store which serves as the coarse channel of information and translates the input data for the unit digits into corresponding analog voltages. In the embodiment of the invention herein disclosed this conversion is effected by a toroidal autotransformer 212 having two windings 213 and 214 wound on an annular core 215. The winding 213 is provided with ten times as many turns as the winding 214, and each winding is provided with ten linearly arranged taps. Hence, the voltage between taps on the winding 213 will be ten times as great as the voltage between taps on the winding 214. Energizing voltage for the transformer is provided by conductors 449 and 450 which apply the reference A.C. voltage across the end terminals of the winding 213. The taps of winding 213 are connected to the 0–9 contacts of a stepping switch bank 2SS–C and the taps of winding 214 are connected to the 0–9 contacts of a stepping switch bank 3SS–C. The upper end of winding 214 is also connected directly to the lower end of winding 213 so that the winding 214 forms an extension of winding 213 but with only one tenth as many turns between taps. The sliders of stepping switch banks 2SS–C and 3SS–C are connected to the end terminals of a primary winding 216 of a 2:1 step down transformer 217. The secondary winding 218 of the transformer has one terminal connected to the conductor 450 while the other terminal thereof is connected to a conductor 943 which eventually is connected to an input terminal of the error amplifier 75 (FIG. 6) for a purpose hereinafter to be described. The stepping switch 2SS is associated with the units digit of the tool length input information while the stepping switch 3SS, as previously mentioned, is associated with the tenths digit thereof. As before noted, the settings of the stepping switches associated with the shown, stepping switch 2SS is set on contact #4. Hence the settings of the stepping switches associated with the tool length store are such as to represent 4.567 inches.

As hereinbefore noted, each 360° displacement of the fedback unit is equal to 2 inches of movement of the drill head. Thus, for each .5 inch of slide movement, the corresponding angle enters a different quadrant, and means must be provided for reversing the sign of the sine and cosine values in accordance with the quadrant concerned. For example, if the digital input lies between 0 and .5, the angle lies in the first quadrant and the sine and cosine values are both positive. If the digital input lies between .5 and 1.0, the angle lies in the second quadrant and the sine remains positive while the cosine becomes negative. If the digital input lies between 1.0 and 1.5, the angle lies in the third quadrant and the sine and cosine are both negative. If the digital input lies between 1.5 and 2 the angle lies in the fourth quadrant and the sine remains negative while the cosine becomes positive. The required change in sign is therefore readily recognizable and may be controlled by appropriate relay circuitry.

Referring to the wiring diagram FIG. 14k, it will be seen that the stepping switch 2SS has a contact bank B (line 259) the odd numbered contacts of which are connected to a wire 221. This wire is connected to a source of energizing potential 448 (255) while the even numbered contacts are left unconnected. A control relay 63CR has one side of its operating coil connected to ground and the other side connected to the wiper of the switch bank 2SS–B. Therefore, whenever the units digit of the input quantity is odd, the relay 63CR will be energized. The stepping switch related to the .1 inch digits has a bank 3SS–B (262) in which the contacts 0–4 are all connected to a conductor 223 while the contacts 5–9 are all connected to a conductor 224. A control relay 64CR has one side of its coil connected to the source of energizing potential 448 while the other side thereof is connected to the conductors 223 and 224 through normally open and normally closed contacts of the relay 63CR. The wiper of stepping switch bank 3SS–B is connected to ground. As a result, when the units digit is "0" and the .1 inch digit lies between 0 and 4, both relays 63CR and 64CR will remain deenergized. Hence, the conductors 202 and 450 (FIG. 8) will be connected to output conductors 936 and 937 while the conductors 208 and 450′ will be connected to output conductors 934 and 935, and the sense of the sine and cosine voltages will both be positive. If the .1 inch digit should fall between 5 and 9, relay 64CR will be energized, thereby connecting conductor 208 to the output conductor 935 and the conductor 450′ to the output conductor 934. This will change the sense of the cosine voltage from + to − as it should be for an angle lying in the second quadrant. If, now, the units digit is "1" and the .1 inch digit falls between 0 and 4, relay 63CR will be energized and close its normally open contacts in line 264 so as to energize relay 64CR. Hence, the sense of both the sine and cosine voltages will be changed as is appropriate for an angle lying in the third quadrant. If the .1 inch digit should fall between 5 and 9, then, since the normally closed contacts of relay 63CR in line 263 are now open, relay 64CR will be deenergized. Hence, while the sense of the sine will remain negative, the sense of the cosine will be positive which is correct for an angle lying in the fourth quadrant.

*Hole depth store*

If the angle into which the tool length input data is converted is designated as angle A, then the output voltage appearing on conductors 936 and 937 will be proportional to sine A while the output voltage appearing on conductors 934 and 935 will be proportional to cosine A.

In order to provide the addition of the trigonometric function hereinbefore referred to, the output voltage from the tool length store representing sine A is applied to a sine-cosine autotransformer 225 (FIG. 9), and the output voltage representing cosine A is applied to a sine-cosine autotransformer 226 (FIG. 10). The autotransformers 225 and 226 are identical in every respect with the previously described autotransformer 172 and, therefore, are believed to require no further explanation. The autotransfromers 225 and 226 have, as shown, supplementary transformers which are identical to the transformer 178 (FIG. 8) for injecting correcting voltages into the leads from the taps of the autotransformer for the purpose hereinbefore described.

Referring again to FIG. 9, it will be noted that there is provided a stepping switch bank 7SS–C having ten contacts 0–9, inclusive, which are connected to the terminals of autotransformer 225 so as to provide voltages proportional to the sine of 0° to 162°, respectively. There is also provided a stepping switch bank 7SS–D having contacts 0–9 which are connected to the terminals of transformer 225 and provide voltages proportional to the sine of 18° to 180°, respectively. The wipers of banks C and D of stepping switch 7SS are connected to the end terminals of a winding 227 provided on a transformer 228 which is identical with transformer 195 (FIG. 8) and, like that transformer, has a second winding 229 (FIG. 9) having one tenth the number of turns as winding 227. The windings 227 and 229 are provided with linearly spaced taps which are connected to the contacts of stepping switch banks 8SS–C and 9SS–C. The wipers of these two banks are positioned in accordance with the .01 inch and .001 inch units of the hole depth data. The wipers are connected by a wire 230, and an output conductor 231 is connected to the "0" tap of the winding 229.

The cosine function is obtained in a similar fashion from the autotransformer 225, the contacts 0–9 of a stepping switch bank 7SS–E being connected to these terminals to provide voltages proportional to the cosine of 0° to 162°, respectively. The contacts 0–9 of a stepping switch bank 7SS–F are connected to the terminals of autotransformer 225 to provide voltages proportional to the cosine of 18° to 180° respectively. The voltage difference between the wipers of these two banks of contacts is applied across a winding 234 of a transformer 235 which again may be identical to the transformer 195. Like this transformer, the transformer 235 has a second winding 236 which has only one tenth as many turns as the winding 234. Both windings are linearly tapped, the taps on winding 234 being connected to the 0–9 contacts of a stepping switch bank 8SS–D, while the taps of winding 236 are connected to the 0–9 contacts of a stepping switch bank 9SS–D. The wipers of these two banks are connected together as before and the output voltage is derived from a conductor 237.

For a slide movement of .432 inch, as indicated by the location of the wipers on the stepping switches in FIG. 9, there will be provided between the conductors 231 and 937 a voltage which is proportional to the value of sine 77.76° (72+5.4+.36). Similarly, there will be provided between the output conductor 237 and conductor 937′ a voltage which is proportional to the value of the cosine of 77.76°. If this angle be designated as angle B, then, since the input to conductors 936 and 937 is sin A, the output from conductors 231 and 937 will be sin A sin B and the output from conductors 237 and 937′ will be sin A cos B. The contacts of relays 60CR (212) and 61CR (220) are employed to connect the conductors 231 and 937 to the output conductors 980 and 981 and the conductors 237 and 937′ to the output conductors 982 and 983. The sine and cosine voltages are applied to the output conductors in the proper sense by appropriate operation of relays 60CR and 61CR, this circuitry being identical with that previously described in connection with sign reversing relays 63CR and 64CR (FIG. 8).

The sine-cosine converter shown in FIG. 10 is similar to that described in connection with FIG. 9 and includes stepping switches 7SS–J and 7SS–K which derive voltages proportional to the sine function from the taps of autotransformer 226 and apply these voltages to the windings of a linearly tapped transformer 240. The taps of this transformer are connected to stepping switches 8SS–F and 9SS–F which interpolate the .01 and .001 inch units and apply to output conductors 986 and 987 a voltage which is proportional to sin B. The cosine function is derived by stepping switches 7SS–G and 7SS–H which are connected to the taps of autotransformer 226 in the manner previously described. The voltage obtained from the contacts of these two banks are applied to a winding on transformer 241 having two windings with linearly spaced taps which are connected to the contacts of stepping switch banks 8SS–E and 9SS–E. The wipers of these two banks are electrically connected together, and the output voltage applied to conductors 984 and 985 is proportional to cos B. Since the input applied to the transformer 226 is a voltage proportional to cos A, the output from conductors 986 and 987 will be proportional to cos A sin B, while the output from conductors 984 and 985 will be proportional to cos A cos B.

Figure 11:
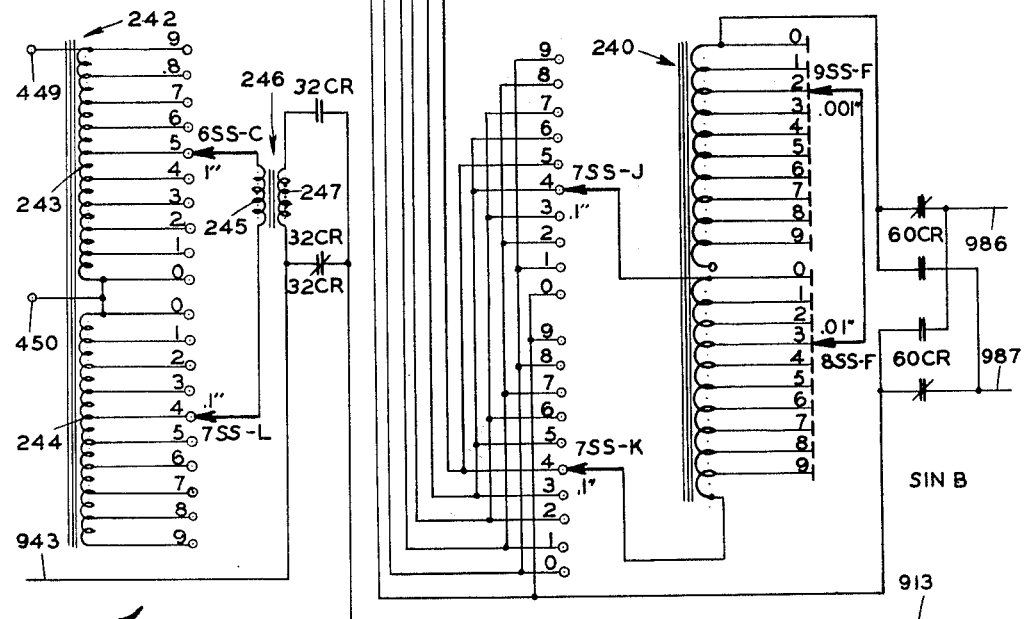

A coarse channel for the units digits of the input data is provided for the hole depth store and is similar in character to the coarse channel for the tool length store shown in FIG. 8. As shown in FIG. 11, there is provided a linearly tapped autotransformer 242 having two windings 243 and 244. The winding 243 is provided with ten times as many turns as the winding 244, and the former winding has the reference voltage applied across it by conductors 449 and 450 connected to its end terminals. The ten linearly disposed taps of the winding 243 are connected to the contacts 0–9 of a stepping switch bank 6SS–C while the ten taps of the winding 244 are connected to the contacts 0–9 of a stepping switch bank 7SS–L. The wipers of these contact banks are connected to the end terminals of a primary winding 245 of a 2:1 stepdown transformer 246. The secondary winding 247 of the transformer is arranged to be connected either in series between conductor 943 and an output conductor 913 by the contacts of a relay 32CR when this relay is energized, or, it may be deleted from the circuit and the conductor 943 connected directly to the conductor 913 when the relay 32CR is de-energized as shown in FIG. 11.

*Feed store*

Figure 12:
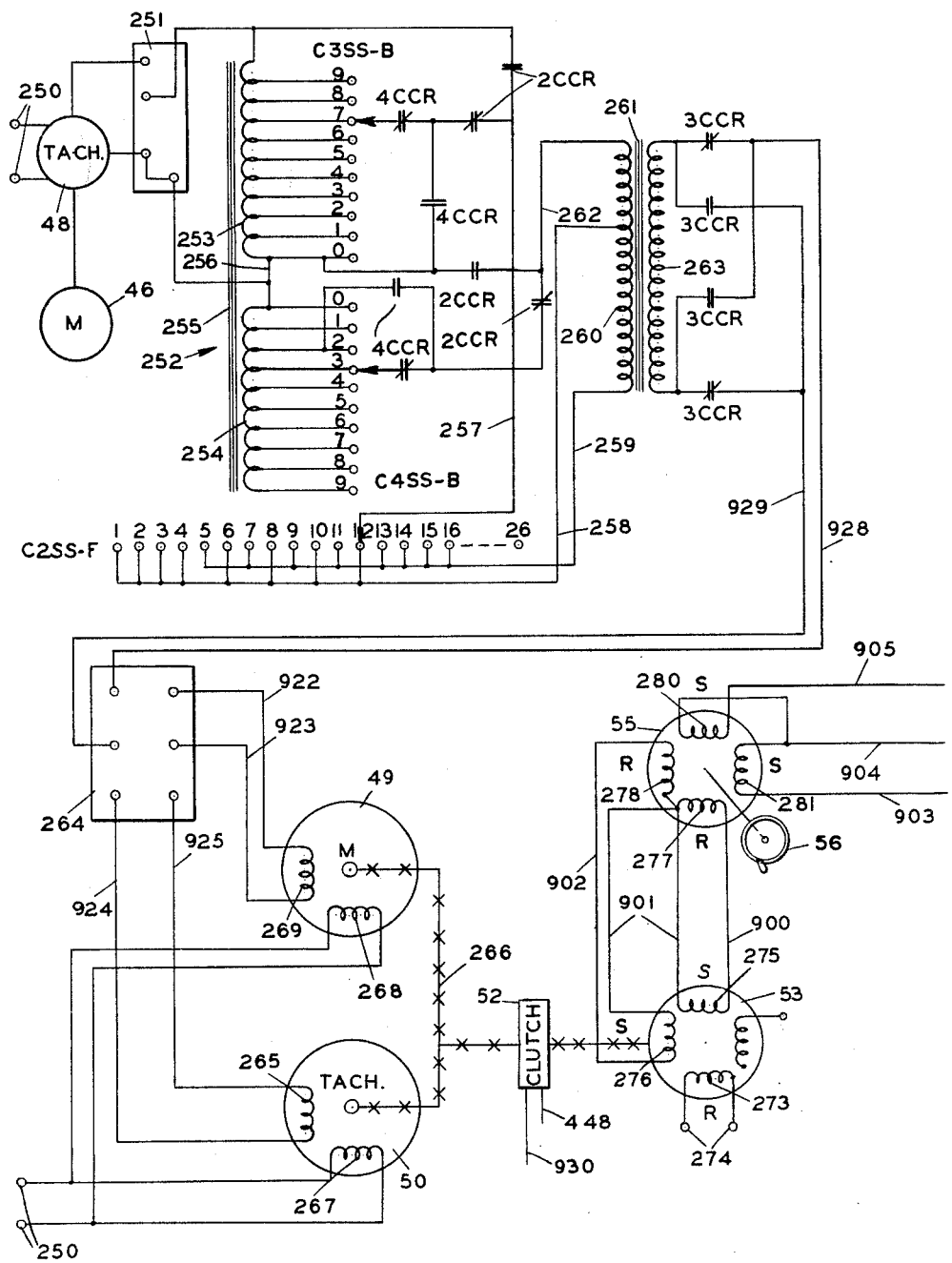
FIGS. 12 and 13 are schematic views showing the positioning control unit.

As was previously described in connection with FIG. 1 of the drawings, the spindle drive motor 46 has a direct driving connection to a tachometer 48 which, as shown in FIG. 12, is adapted to be energized by connecting its terminals 250 to an alternating current source such as a 110 volt, 60 cycle line. The A.C. output voltage of the tachometer, which will be proportional to the speed of the driving motor 46, is applied to the input terminals of a cathode follower amplifier 251. The output of the amplifier 251 is utilized to energize a feed store comprised of a toroidal type autotransformer 252 having two windings 253 and 254 wound on an annular core 255. The amplifier has a relatively high input impedance and a relatively low output impedance and serves to match the tachometer impedance with that of the transformer 252. The output voltage from the amplifier 251 is supplied across the winding 253 which has ten times as many turns per tap as the winding 254. The adjacent ends of windings 253 and 254 are connected together by a lead 256, and the taps of winding 253 are connected to the contacts 0–9 of a stepping switch bank C3SS–B while the taps of winding 254 are connected to the 0–9 contacts of a stepping switch bank C4SS–B. With this arrangement the wiper of bank C3SS–B will pick off tens of units of feedrate voltage while the wiper of bank C4SS–B will pick off the units values. This enables the feedrate voltage provided by the tachometer 48 to be divided into one hundred equal parts so that one hundred different feedrates may be selected in accordance with input data impressed on the tape. It is also to be noted that inasmuch as the tachometer 48 is driven directly from the spindle drive motor 46, any variation in the speed of the motor due to a variation in the load on the cutting tool will cause a corresponding variation in the rate of feed of the spindle so that the amount of feed per revolution of the spindle will remain constant. This, of course, is essential for the accurate tapping of holes in the workpiece, and it is also desirable in the drilling of holes since the thickness of the chip will thereby remain uniform.

The wiper of bank C3SS–B is connected through normally closed contacts of relays 4CCR and 2CCR to a wire 257 which is connected to the wiper of bank F of a stepping switch C2SS. The contacts of this bank are connected to wires 258 and 259 in the same relation as the contacts of a bank C2SS–E (FIG. 14a, line 6) which constitutes the spindle speed store of the system. The contacts connected to the wire 258 are associated with the low speed operation of the spindle motor while the contacts connected to the wire 259 are associated with the high speed operation of the spindle motor. The wire 258 is connected to a tap on the primary winding 260 of a transformer 261 and the wire 259 is connected to one end of the winding. The other end of the winding is connected by a wire 262 to the wiper of bank C4SS–B through the normally closed contacts of the relay 4CCR. The ratio of the turns in the two sections of the primary winding 260 is the same as the ratio of the high and low speeds of the spindle motor. In other words, if the high speed of the motor is 3200 r.p.m., and the low speed is 800 r.p.m., then if there is a total of 3200 turns on the primary winding, the tap 258 would be located 800 turns from the end to which wire 262 is connected. If the secondary winding 263 has the same total number of turns as the primary, it will be seen that a 1:1 ratio exists when the input is across the entire primary winding, and that a 1:4 ratio prevails when the input is across the 800 turns. Hence, since the input is placed across the entire winding when the motor is operated at high speed and across the 800 turn portion of the winding when it is operated at low speed, the voltage induced in the secondary winding will be the same for a given setting of the feed store wipers regardless of which speed is selected by the spindle speed store C2SS.

Feed drive

The feed voltage thus obtained from the feed store is connected to wires 928 and 929 through the reversing contacts of a relay 3CCR (FIG. 14g, line 170). The wires 928 and 929 are connected to the input of an amplifier 264 which also receives an input from the output winding 265 of tachometer 50 through wires 924 and 925. This device is mechanically driven by pacer motor 49 as indicated by the x—x line 266 and is provided with an energizing winding 267. This winding and an energizing winding 268 of the pacer motor are connected to the terminals 250 which, as previously mentioned, are connected to a suitable source of alternating current. The input to amplifier 264 from the tachometer is compared with the input from the feed store, and the difference is amplified and transmitted by wires 922 and 923 to a control winding 269 of the pacer motor 49. The pacer motor may consist of a two-phase servomotor which will run in one direction or the other depending on the relative phase of the voltage supplied to winding 269 as compared to the voltage supplied to the winding 268. Thus, when the reversing contacts 3CCR are operated, the phase of the voltage supplied to winding 269 will be shifted 180°, and the motor will reverse its direction of rotation. Similarly, if the spindle motor 46 is reversed, the phase of the voltage produced by the tachometer 48 will be shifted 180°, and the pacer motor will also be reversed. The tachometer 50 and amplifier 264 comprise a feedback loop which causes the pacer motor to run at a speed proportional to the voltage supplied from the feed store.

Four pairs of contacts of a rapid traverse relay 2CCR (FIG. 14g, line 168) are so applied to the connections to the feed store shown in FIG. 12 that when this relay is energized, the full output voltage from the amplifier 251 will be applied to the primary winding of transformer 261, and the pacer motor will be run at maximum speed. There is also provided a creep speed relay 4CCR (FIG. 14g, line 167) which has four pairs of contacts in FIG. 12 so connected as to cause some predetermined low voltage, for example, two units out of a possible one hundred units, to be applied to the primary winding 260 thereby causing the pacer motor to run at a creep speed.

The pacer motor is connected through a servomechanism to the drill head 62 (FIG. 13), and it thereby causes the drill head to be moved up or down on the column at a uniform speed determined by the feed voltage supplied from the feed store. The combination of a pacer motor driving a hydraulic servomechanism has certain unique advantages over either an electric servo or a hydraulic servo. In the first place, a hydraulic servo has the advantage of high torque and low moment of inertia but suffers from the fact that its velocity control is poor, i.e., it is difficult to maintain a constant feed rate since this is essentially an open loop operation. By combining a constant speed pacer motor with a hydraulic servo, this disadvantage is overcome. This combination also has the advantage of better load regulation than other known types of feed mechanisms. This results from the fact that the pacer motor is insensible to any changes in load on the slide and the load regulation of the system is therefore equal to the "stiffness" of the hydraulic servomechanism which is very high.

As shown in FIG. 12, the pacer motor is connected through an electromagnetic clutch and brake 52 to the transmitter unit 53 which, in the present exemplification of the invention, is a resolver. The clutch 52 has an actuating coil which, when energized through leads 448 and 930 (see also FIG. 14h, line 193), will connect the pacer motor to the resolver. When the clutch is de-energized, the pacer motor will be disconnected therefrom and a brake will be applied to bring the resolver to a quick stop. The resolver has a rotor winding 273 connected to terminals 274 which are in turn connected to a source of alternating current of suitable voltage and frequency. The stator windings 275 and 276 are connected by wires 900, 901 and 902 to the rotor windings 277 and 278 of a differential consisting of the resolver 55 which is arranged for operation by the handwheel 56. The stator windings 280 and 281 of this resolver are connected by wires 903, 904 and 905 to the rotor windings 282 and 283 (FIG. 13) of a receiver comprised of the resolver 54. A stator winding 284 of resolver 54 is connected by wires 914 and 100 to the input of servoamplifier 57. The A.C. error voltage thus applied to the servoamplifier is converted into a D.C. control voltage which serves to energize the differential coils 285 and 286 of the electrohydraulic servovalve 58. This valve controls the direction and speed of operation of hydraulic motor 59 which drives the drill head 62. A mechanical driving connection 287 which includes the gears 99 and 101 (FIG. 3) feeds back the position of the slide 62 to the resolver 54 so that any discrepancy between the position of the transmitter 53 and the slide will be translated into an appropriate error signal appearing in the winding 284. As previously mentioned, the feedrate or velocity of the drill head will be of the same order of precision as that of the pacer motor 49, and the load regulation will be proportional to the "stiffness" of the servomechanism. Also, the amount of travel of the drill head 62 per revolution of the spindle will remain constant despite variations in the speed of this motor. The drill head may also be moved under the control of handwheel 56, thereby permitting manual adjustment of the tool relative to the workpiece.

Position control unit

Besides the resolver 54, there is also packaged in the housing 96 (FIG. 1) a resolver 290 also driven from the motor 59 as indicated by the x—x line 291. This device serves as the error detector for the trigonometric or fine channel of the control system. A ten turn potentiometer 292, also contained in the housing 96 and driven by the motor 59 through suitable driving connections as indicated by the x—x line 293, acts as the coarse error detector for the system. The ends of the potentiometer winding are connected to wires 294 and 295 which run to terminals 449 and 450. These terminals, as previously indicated, are connected to a source of reference A.C. potential so that this voltage is applied across the winding of potentiometer 292. The wiper of the potentiometer is connected by a wire 296 to one terminal of a primary winding of a transformer 297 contained in the error amplifier 75. The other terminal of the primary winding is connected by a wire 298 and the normally open contacts of a relay 37CR to the wire 913 which, as previously described in connection with FIG. 11, is the output lead from the coarse channel stores. Hence, the information analog transmitted by wire 913 is compared with a position feedback voltage derived from potentiometer 292, and the difference, if any, appears as a voltage across the primary winding of transformer 297. If the gearing between the slider of potentiometer 292 and the motor 59 is such that the slider moves from one end of the potentiometer to the other for twenty inches of movement of the drill head, then it becomes necessary to scale down the voltage from the linearly tapped transformers 212 (FIG. 8) and 242 (FIG. 11) so that the maximum voltage output from these transformers is five volts each. It is for this reason that the transformers 217 (FIG. 8) and 246 (FIG. 11) are 2:1 step-down transformers.

As hereinbefore noted, the resolver 290 serves as the error detector for the trigonometric or fine information channel of the control system. This resolver is so geared to the motor 59 that it makes one revolution for every two inches of movement of the drill head 62. The resolver is provided with stator windings 300 and 301 which are arranged in quadrature and receive the angular information data from the trigonometric stores. The resolver is also provided with a rotor winding 302, one end of which is connected by a wire 303 to ground, and the other end of which is connected by a wire 304 and the normally open contacts of relay 32CR to a wire 305 connected to one end of a primary winding of a transformer 306 in the error amplifier 75. The other end of the primary winding is connected to ground so that any error voltage appearing in the resolver winding 302 will also be impressed across the primary winding of transformer 306.

The function of $\sin(A+B)$, i.e., $\sin A \cos B + \cos A \sin B$ will be impressed on the winding 300 of resolver 290. This results from the fact that the voltage proportional to $\sin A \cos B$ transmitted by conductors 982 and 983 is added to the voltage transmitted by conductors 986 and 987 which is proportional to $\cos A \sin B$ by a transformer 308. In a like manner, the function of $\cos(A+B)$, i.e., $\cos A \cos B - \sin A \sin B$ will be impressed across winding 301. This comes about as a result of the subtraction of the voltage proportional to $\sin A \sin B$ appearing across conductors 980 and 981 from the voltage proportional to $\cos A \cos B$ appearing across conductors 984 and 985 through a transformer 309. Thus, when the rotor of the resolver 290 is positioned so that 0 voltage appears in the rotor winding 302, then the angular position of the rotor will be equal to $A+B$.

Figure 13:
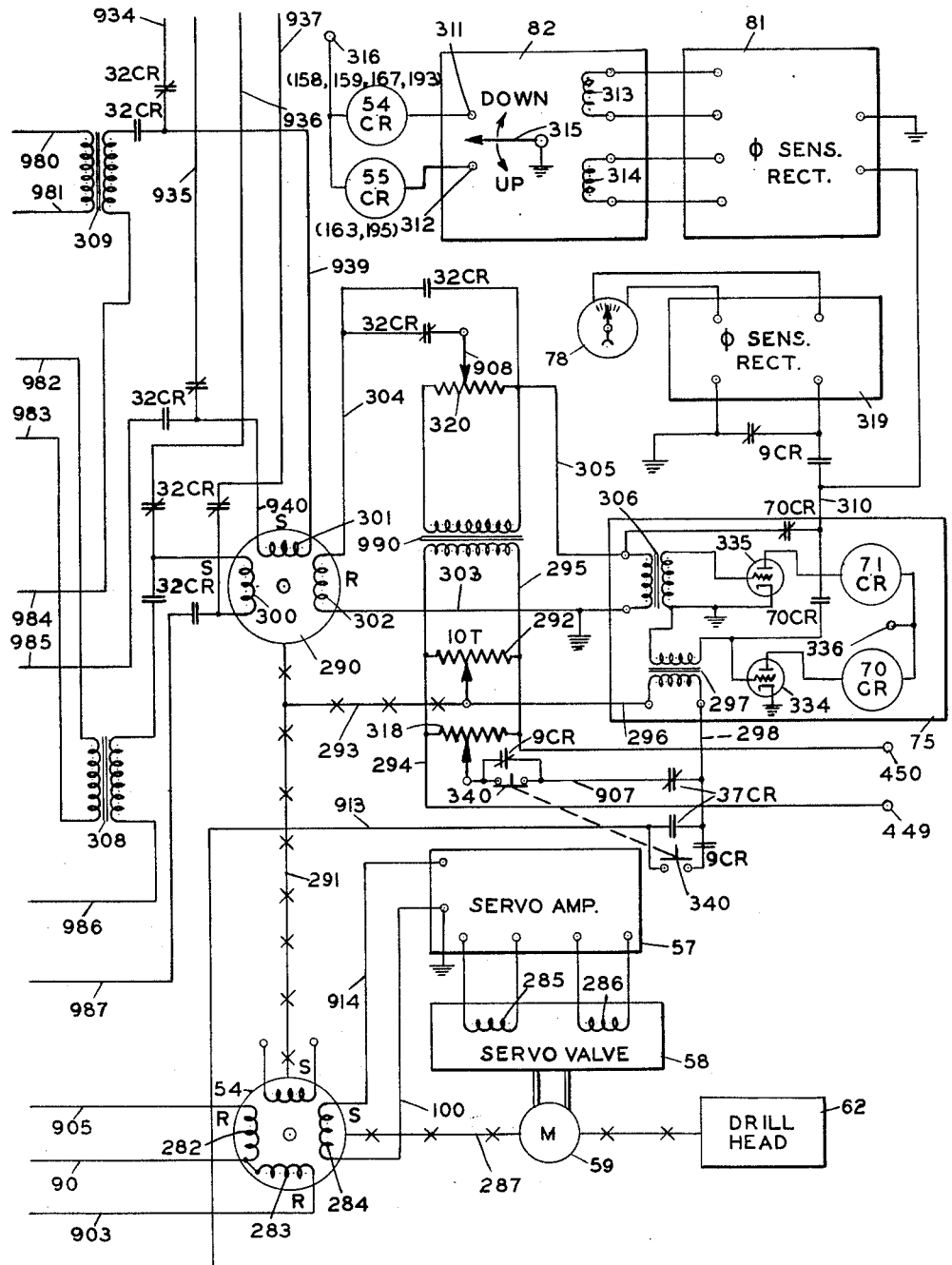

As shown in FIG. 13, there are ten pairs of contacts of control relay 32CR (FIG. 14f, line 153) which permit bypassing or shorting of the hole depth store during certain portions of the operation of the machine. When the relay 32CR is in its deenergized condition, as illustrated in FIG. 13, the hole depth store is shorted and information from the tool length store only is supplied to the stator windings 300 and 301 of the resolver 290. Thus, with the contacts in the condition shown, the conductors 934 and 935 (see also FIG. 8) will transmit a voltage proportional to cos A to the winding 301 by wires 939 and 940, while the conductors 936 and 937 which have impressed thereon a voltage proportional to sin A are connected to the winding 300. At the same time the secondary windings of transformers 308 and 309 will be disconnected by virtue of the open contacts of relay 32CR from the stator windings. When the relay 32CR is energized, however, the conductors 934, 935, 936 and 937 will be disconnected from the stator windings and the secondary windings of transformers 308 and 309 will be connected thereto so that the sum of the tool length and hole depth information will be supplied to the error detector 290.

To avoid unnecessary expansion of the present application, the error amplifier 75 has not been shown in detail since it is of conventional design and does not per se constitute inventive subject matter. In connection with this unit it is necessary only to state that it incorporates electronically controlled relay circuits, which may include vacuum tubes 334 and 335 which cause two relays 70CR and 71CR connected in the plate circuits thereof to be energized or deenergized by a source of B+ voltage 336, depending on the amplitude of the error signal. Thus, the relay 70CR is adapted to be energized by the error signal supplied through the coarse channel to the transformer 297, and this relay will drop out when the error signal is reduced to a predetermined low voltage. For example, this relay may be adjusted to drop out when the drill head is within one half inch of the final position indicated by the input data. The relay 71CR is adapted to be controlled by the error signal from the fine channel which is applied to the primary winding of transformer 306. This relay may be arranged to drop out when the error signal reaches some predetermined low value, say for example, when the drill head is within .100 of an inch of its final position. As shown, the error amplifier 75 contains two pairs of contacts of relay 70CR which serve, when this relay is energized, to transmit the error signal from the coarse channel to an output lead 310 and, when deenergized, to connect the error signal from the fine channel to the output lead. The relays 70CR and 71CR also have contacts in lines 48 and 49 (FIG. 14c) of the wiring diagram for control purposes as will hereinafter be described.

The output lead 310 is connected to the input of a phase-sensitive rectifier 81 which converts the A.C. error voltage into a D.C. voltage which is either plus or minus depending on the phase of the A.C. voltage with reference to the reference voltage applied to terminals 449 and 450. The output of the phase-sensitive rectifier is connected to the energizing coils of a Micropositioner 82 which is essentially an ultra-sensitive, polarized, D.C. relay capable of operating on very low input powers. It is a commercially available item manufactured and sold by the Barber-Colman Co. of Rockford, Illinois. The armature of the Micropositioner is normally spring biased to a central position in which both contacts 311 and 312 are open. However, when the current in coil 313 exceeds the current in coil 314, or vice versa, the armature 315 will be moved and close one or the other of the contacts. When the armature engages the contacts it will energize a relay 54CR or 55CR since these relays are connected to a source of energizing potential 316, and the armature 315 is connected to ground. Thus, the sense and presence of an error signal is detected by the energization of relays 54CR and 55CR which, however, will drop out when the error signal reaches some predetermined minimum value such as when the slide is within .0005 inch of its final position. The relays 54CR and 55CR have contacts which, as will hereinafter be described, control the clutch 52 and cause it to be deenergized when the slide has reached its final position.

To enable the slide or drill head 62 to be raised to a turret indexing position, there is provided a potentiometer 318 which is supplied with energizing potential from the terminals 449 and 450 through the wires 294 and 295. The wiper of this potentiometer is connected by a wire 907 and normally closed contacts 37CR to the wire 298 which is connected to one end of the primary winding of transformer 297 in error amplifier 75. Thus, when relay 37CR (FIG. 14g, line 183) is deenergized, the voltage from the potentiometer 318 will be substituted for the coarse channel information analog and the drill head will move up to the position indicated by the setting of the potentiometer 318.

To permit setting of the tool length store switches in an empirical manner during setup of the machine there is provided a phase-sensitive rectifier 319 which is controlled by the contacts of a relay 9CR (FIG. 14c, line 51) so that when this relay is energized the rectifier 319 will be connected to the output lead 310 of the error amplifier. The D.C. output signal from the rectifier 319 is applied to a milliammeter 78 which serves to indicate when the tool length store is adjusted for minimum error signal.

In order to permit the tool length stores to be adjusted so as to bring the end of each tool to a predetermined distance above the surface of the workpiece to provide the necessary clearance for adjustments of the work table to move the tool to a different hole location, a stepdown transformer 990 has its primary winding connected to the wires 294 and 295 and its secondary winding connected across a potentiometer 320. One end of the potentiometer is connected by the wire 305 to the fine channel input of the error amplifier, and the wiper 908 of the potentiometer is connected through the normally closed contacts of relay 32CR to wire 304 which is connected to the ungrounded side of the rotor winding 302 of resolver 290. Hence, the voltage appearing between the wiper 908 and the right hand end of the potentiometer winding will be injected into the connection between the winding 302 and wire 305 and will add to the voltage from the tool length store a voltage equal to a predetermined spacing between the end of the drill and the work surface. Hence, if the offsetting voltage introduced by the potentiometer 320 is equal to a displacement of .050 of an inch of the drilled head, a shim of this thickness may be placed on the work surface and the tool brought into contact with the shim when the tool length store switches are being set for minimum reading of meter 78. When relay 32CR is energized to unshort the hole depth store, the potential from potentiometer 320 will be removed, and the voltage from the tool length store will now represent the actual surface of the work.

Table positioning unit

The servomechanisms utilized for positioning the work table 28 in the X and Y coordinate directions is schematically illustrated in FIG. 5 of the drawings. As therein shown, the hydraulic motor 29 operates a lead screw engaging with a nut secured to a slide 322 so as to move the slide back and forth in the X direction. The hydraulic motor 30 operates a lead screw which meshes with a nut attached to the work table 28 and moves it back and forth in the Y direction on the slide 322. Operation of motors 29 and 30 is controlled by solenoid valves 323 and 324, each of which is provided with a pair of solenoids 325 and 326 which are adapted to be energized from a source of energizing potential 327 under the control of Micropositioners 328 and 329. The motors 29 and 30 are geared to resolvers 330 and 331, which have quadrature windings for receiving angular position data from the X and Y stores 22 and 23. The rotor winding of each resolver is connected to a servoamplifier 332 and 333 which, in turn, actuates the grounded armature of its associated Micropositioner. The existence of a discrepancy between the information provided by the stores and the angular positions of the resolver rotors is indicated by the energization of relays 50CR, 51CR, 52CR and 53CR. When all four of these relays are deenergized, the table 28 is properly positioned, and the drilling, tapping or other operation may proceed. A relay 30CR (FIG. 14f, line 145) has a pair of normally open contacts inserted between the source 327 and the solenoids 325 and 326 so that positioning of the table 28 cannot take place except when the relay 30CR is energized.

Cycle control circuits

The relay and switching circuitry utilized for controlling the operation of the turret drill is shown in the wiring diagram comprising FIGS. 14a to 14h, inclusive and FIGS. 14j and 14k. The horizontal lines of the diagram are numbered in the left hand margin and provide a convenient means for locating the component parts of the circuit. The legends in the right hand margin indicate the functions performed by the relays, solenoids, stepping switches, etc., and the numbers following the legends refer to the lines of the wiring diagram where the relay or switch contacts are found.

The terminals L1, L2, and L3 shown at the top of FIG. 14a are connected to a three-phase voltage source and thereby provide a source of energizing potential for the spindle drive motor 46. This motor is a two-speed machine of conventional design and has two separate windings, one of which will operate the motor at high speed and the other at low speed.

The terminals L1 and L2 are also connected to the primary winding of a transformer 399 which has a secondary winding connected to conductors 100 and 400 thereby serving to energize the same with A.C. potential. Relays ML and MH are connected across the conductors 100 and 400 through a stepping switch contact bank C2SS–E (line 6) so as to selectively energize one of the relays in accordance with the position of the wiper 404. A manually operable switch 401 provides a means for deenergizing the relays and stopping the spindle drive motor should this be found desirable. When relay ML is energized, its contacts in lines 1–3 of the wiring diagram will be closed and cause the motor to run at low speed. When relay MH is energized, its contacts in lines 4–6 will be closed and cause the motor to run at high speed.

The stepping switch C2SS(231) is adapted to be positioned in accordance with information punched on a paper tape, as will hereinafter be described, and also operates to control the electromagnetic clutches 1CL–6CL previously described in connection with FIG. 1 of the drawings. As shown in lines 31–47 of the wiring diagram, clutches 1CL and 2CL are energized from a source of D.C. current provided by conductors 462 and 467 under the control of a contact bank C2SS–B. Similarly, the energization of clutches 3CL and 4CL is controlled by a contact bank C2SS–C, and the energization of clutches 5CL and 6CL is controlled by a contact bank C2SS–D. Hence, by virtue of the sixteen positions utilized on stepping switch C2SS, it is possible to select any one of sixteen different spindle speeds. The #17 contact is utilized in banks C and D to energize clutches 5CL and 6CL simultaneously thereby braking the spindle and bringing it to a stop. Since the #17 contact in bank E (6) is not connected, the relays 1ML and 1MH will be deenergized thereby deenergizing the spindle motor 46 when the brake is applied.

Positioning of the turret is likewise controlled from the tape by means of a stepping switch TSS (207). As shown in lines 13a–19 of the diagram, the solenoids 1SOL, 2SOL and 3SOL, which determine the positions to be assured by the turret, are arranged to be selectively energized under the control of contact banks C, D and E respectively, of stepping switch TSS. Thus, when the wipers are stepped to the #1 contacts as shown, none of the solenoids will be energized and the #1 turret will be selected. When the stepping switch is moved to the #2 contacts, the #2 turret will be selected, and so forth.

Energization of the solenoids is controlled by the normally open contacts of relay 57CR in line 15a. Relay 57CR (13a) will be energized when a tool change is signalled in position #4 of the master stepper and will remain energized until the turret is positioned and clamped.

Indexing of the turret is controlled by a tool index relay 105CR (27) which may be energized either by the depression of the pushbutton 402 (25) during setup of the machine when relay 9CR will be energized, or it may be automatically energized at the appropriate time in the machine cycle as will hereinafter be described. When relay 105CR is energized, its contacts in line 20 will be closed and energize solenoid 4SOL (see also FIG. 3) thereby unclamping the turret and withdrawing the locating pin 158 and bevel gear 118. The relay 105CR has normally open contacts in lines 44 and 45 which are closed during turret indexing and a pair of normally closed contacts in line 5 which are open at this time. Thus, the spindle motor will be deenergized and the brake applied during the turret positioning operation. After the turret is indexed to the new position, relay 105CR is deenergized thereby deenergizing solenoid 4SOL. The piston 155 (FIG. 3) is thereby urged toward the left so as to move the locating pin and bevel gear into engaging position. If the bevel gear 118 meshes properly with the bevel gear 119, the piston will uncover the center port to which line 160 is connected and permit pressure to be reapplied to this line thereby clamping the turret and opening the contacts 1PS in line 176. This deenergizes relay 36CR which opens its contacts in line 21. If, however, the bevel gears do not mesh properly, the switch contacts 1PS will remain closed and maintain relay 36CR energized. Therefore, since contacts 105CR (21) are now closed, as are also the contacts 36CR (21), a timer relay 2TR and spindle jog relay 107CR will be energized. The relay 107CR has a pair of normally open contacts in line 7 which will close and energize relay 1ML through a conductor 403 to select low speed operation of the spindle motor. Relay 107CR also has normally open contacts in lines 34, 40 and 45 which will close and energize clutches 2CL, 4CL and 6CL which select the lowest spindle speed. This will cause the gears to mesh whereupon the turret will be clamped, and contacts 1PS (176) will open and deenergize relay 36CR.

The timer relay 2TR has a pair of delay contacts in line 22 which will time open after the relay 2TR is energized thereby breaking the circuit to the relay 107CR.

Provision is made for reversing the spindle either under manual control or under the control of the automatic tapping mechanism which will hereinafter be described. This is effected by reversing the spindle drive motor 46 under the control of a pair of interlocked relays MF (9) and MR (12). Thus, when the manual selector switch 409 (9) is in the "Forward" position as shown, relay MF will be energized and close its contacts in lines 1 and 2 and connect the motor for forward operation. When the switch 409 is moved to the "Reverse" position, the relay MF will be deenergized and the relay MR will be energized and close its contacts in lines 3 and 4. This will reverse the connections to the motor and cause it to operate in the reverse direction.

Reversal of motor 46 may also be effected automatically by a relay 103 (23) which is energized during tapping operations. This relay has contacts in lines 9–12 which are effective when the relay 103 is energized to deenergize relay MF and energize relay MR, or vice versa.

The turret drill is arranged to perform a series of machining operations on a workpiece in a completely automatic manner. For this purpose the various operations of the machine are selected and controlled by data encoded on a punched tape. Reading of the tape is controlled by a stepping switch 1ESS (73), hereinafter referred to as the master stepper, which has a plurality of contact banks of 26 studs each. The master stepper determines the sequence in which the information is read from the tape and also prevents advance of the tape until the information has been completely abstracted therefrom. The tape may be of the standard eight hole or eight track type in which holes punched in tracks 1, 2, 3, and 4 contain the numerical data and have the values 1, 2, 4 and 8. The holes punched in tracks 5, 6 and 8 are used for parity check, tab sequential and end of block, respectively. Track 7 is not used in the present system.

A tape reader is a commercially available unit having 8 hole-sensing contacts 410 (81–87), one for each track, which close when a hole is present in its associated track. The contacts 410 for track #7 have not been shown since this track is not used. The tape reader also contains a clutch coil 411 (77) which, when energized, pulls out a stop pawl and permits a drive shaft to rotate. This shaft is provided with cams which cause contacts RCC–1 and RCC–2 (79) to close and then open during each rotation of the shaft. The contacts RCC–1 are used to stop the shaft at the end of one revolution, i.e., after one line of tape has been read, and the contacts RCC–2 are used to determine the reading time of contacts 410 during each cycle of the reader.

The reader contacts control a buffer store comprised of six relays (90) each provided with an operating coil 407 and a latching coil 408. The operating coils of the relays actuate the relay contacts and are energized when the reader contacts 410 and contacts RCC–2 are closed. Each latching coil is adapted to be energized when its associated operating coil is energized. Hence, the relays will be held operated until the latching coils are deenergized. This occurs when the master stepper 1ESS (73) is energized thereby opening its interrupter contacts 1ESS–1 in line 73 and breaking the circuit through contacts 17CR (75), 3CR and 6CR (77) to a conductor 574 (81) which is connected through relay contacts 1CR (89), 2CR, etc., to the latching coils.

Referring now to FIG. 14c of the wiring diagrams, a source of energizing potential for the master stepper and other relays of the circuit is provided by conductors 100 and 448 which may be connected to a suitable source of current, for example, a 48 volt D.C. power supply. The machine is provided with a three position selector switch 1SEL having two banks A (52) and B (75) for selecting the type of cycle desired. If, for example, the operator wishes to adjust the tool length stores preparatory to an automatic cycle, he moves the switch 1SEL to the "Pre-cycle" position in which case the pre-cycle relay 9CR will be energized through the contact 1ESS–2 (52) and held energized by the contacts 9CR (51). Similarly, if a manual type cycle is desired, the switch is moved to the "Manual" position thereby energizing the manual relay 3CR. If the operator wishes to condition the machine for an automatic cycle, he moves the switch to the "automatic" position thereby energizing relay 18CR.

To start either a manual cycle or an automatic cycle, the "Cycle" pushbutton 413 (56) is depressed thereby energizing relay 6CR and holding it energized by the 6CR contacts in line 57. If the machine is conditioned for a manual cycle, the relay 6CR will be held energized until the contacts 10CR (56) open at the end of a block of information on the tape. The end of a block is signified by a punch in track #8 which causes relay 10CR (90) to be energized. In the case of an automatic cycle, the relay 6CR will remain energized until the contacts 22CR open at the end of the cycle. If the machine is conditioned for a pre-cycle operation, the relay 6CR cannot be energized.

To enable the tape to be advanced when the machine is conditioned for an automatic cycle but before the "Cycle" pushbutton is depressed, a pushbutton 414 (54) is provided which, when depressed, energizes the tape advance relay 5CR through contacts 10CR (54), a conductor 540, selector switch 1SEL–B (75), contacts 6CR (75) and contacts 1ESS–1 (73). When relay 5CR is energized, it closes its contacts in line 78 and energizes the tape reader clutch 411 through contacts 10CR (77), 17CR (78) and 18CR, all of which are now closed. The tape reader will run and advance the tape until the contacts 10CR (54) are opened by an end of block hole punched in the tape. If selector switch 1SEL is moved to either the precycle position or the manual position when the master stepper is out of its home position, the relays 9CR or 3CR will not be energized since the off normal break contacts 1ESS–2 (52) are now open, and a circuit will be provided to the master stepper through its own interrupter contacts 1ESS–1 (73), contacts 6CR (75), contacts 9CR or 3CR (74, 75) and the off normal make contacts 1ESS–3 (73). Hence, the stepper will advance to its home position whereupon the contacts 1ESS–3 will open and stop the stepper. At the same time the contacts 1ESS–2 will close and energize relays 9CR or 3CR. Depression of the tape advance pushbutton also operates to "home" the master stepper through the closure of the 5CR contacts in line 73 thereby energizing stepper 1ESS through its own interrupter contacts 1ESS–1 and its off normal make contacts 1ESS–3.

During an automatic cycle, the tape reader is adapted to be advanced each time the master stepper advances from one contact to the next. For this purpose the reader clutch is arranged to be energized through the interrupter contacts 1ESS–1 (73), and contacts 17CR (75), 3CR, 6CR (77), 7CR and 10CR. In other words, as soon as the "Cycle" pushbutton 413 is depressed and relay 6CR energized, the clutch coil 411 will be energized and a reading cycle will be initiated. When the contacts RCC–1 close, relay 7CR will be energized and contacts 7CR in line 77 will open and deenergize the clutch. This will release the stop pawl and thus terminate the reading cycle at the end of one full revolution of the drive shaft after the tape has been advanced one line. During the reading cycle the contacts RCC–2 will close, as will also any of the reader contacts 410 which sense a hole, and the appropriate buffer stores will thereby be energized.

Figure 7:
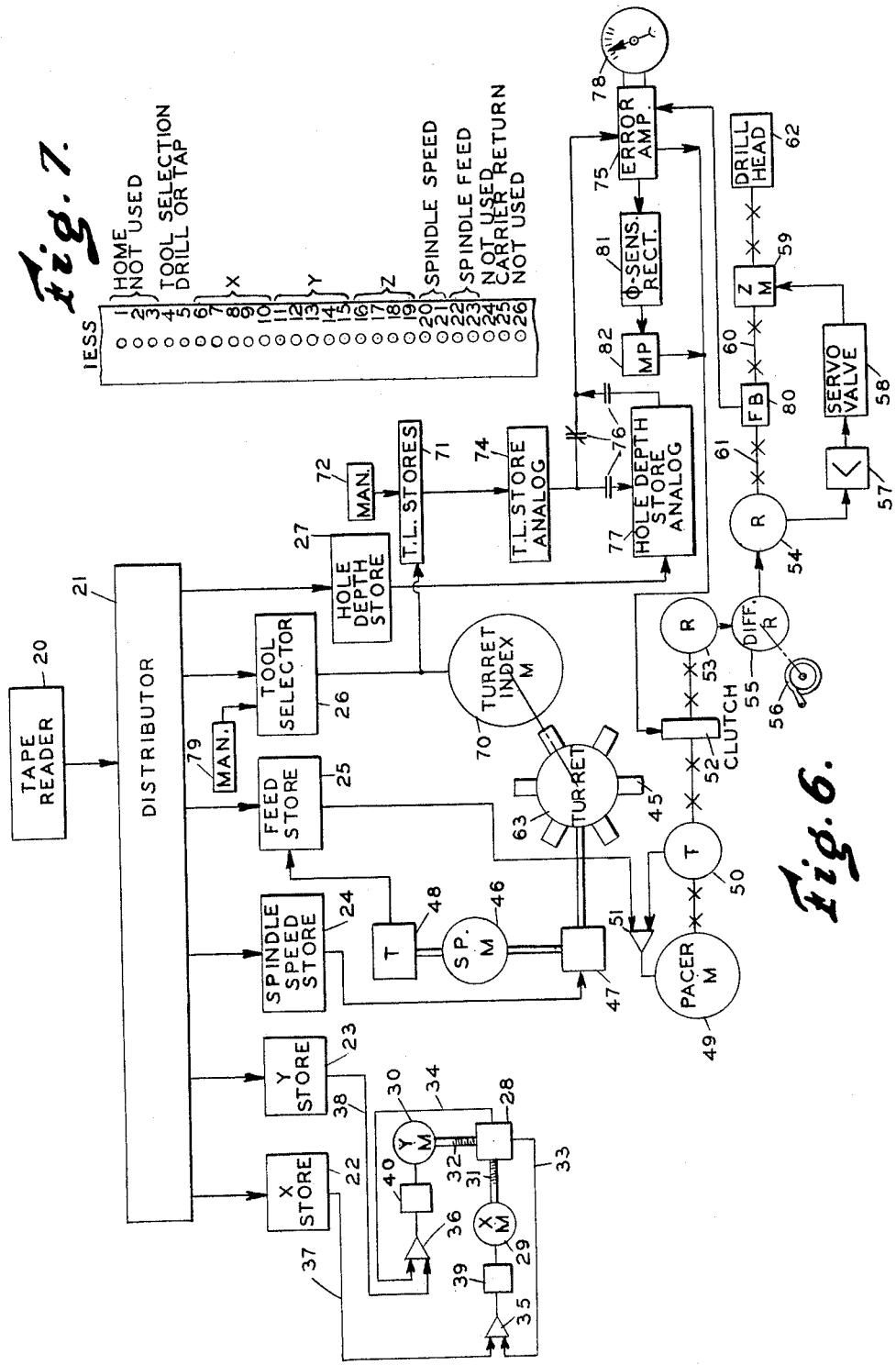
FIG. 7 is a diagrammatic view showing the sequence in which information is read from the tape by the master stepper.

A parity check is utilized to insure that the tape has been correctly punched. In order to secure a "go ahead" signal from the parity check system, an odd number of holes must appear in each line of the tape. In other words, either 1, 3 or 5 of the buffer stores must be energized on any given reading of the tape during an automatic cycle or the master stepper will stop and prevent further operation of the machine. When an odd number of holes are punched, the decoder shown in lines 97–107 will provide a circuit from wire 578 to the parity check relay 11CR and thereby energize the relay through the interrupter contacts 1ESS–1 (73) and relay contacts 17CR (75) and 3CR (76). When the relay 11CR is energized, its contacts 11CR in line 63 will close and establish a circuit to the coil of stepper 1ESS through the wire 556 and wiper 555 of bank 1ESS–E (71). For this operation, it is assumed that the wiper is in its home position on the #1 contact. It is shown in the diagram on the #4 contact since the contacts 1, 2 and 3 are not used (see also FIG. 7). When the stepper is energized, contacts 1ESS–1 (73) open and deenergize line 578 and relay 11CR. This deenergizes the stepper causing it to advance wiper 555 to contact #2. At the same time, relay 7CR and the buffer stores will be deenergized. Deenergization of relay 7CR will initiate another reading cycle as soon as contacts 1ESS–1 close and, if a parity check is obtained during the reading cycle, the stepper will again be energized and step the wiper to the #3 contact. The same operation will again take place if the parity check is obtained, and the wiper will move to the #4 contact as shown in the diagram.

Before proceeding further with the description of the operation of the master stepper, it should be noted that a decoder is provided as shown in lines 108–133 for determining the decimal value of the numerical code punched on the tape. The wires 615–624 of the decoder represent the values 1–9 and 0 respectively and the wire corresponding to the number encoded on the tape will be connected to a conductor 544 and ground through contacts 18CR (78).

The #4 position of the master stepper is assigned to the tool selection function of the machine. Accordingly, the line of tape associated with tool selection is punched with numerical data corresponding to the number of the tool desired. For example, if the #1 tool spindle is to be selected, a hole is punched in track #1. If the #3 tool spindle is wanted, holes are punched in the #1 and #2 tracks. If #6 tool spindle is desired, holes are punched in the #2 and #3 tracks.

Referring to FIG. 14h of the diagram, when the wiper 704 of stepper bank 1ESS–D (207) is on the #4 contact, and a parity check is obtained when the tape is read, a tool selector stepping switch TSS (207) will be energized through contacts 11CR, contacts STCR, and the interrupter contacts TSS–1 of the stepping switch. Under these conditions, the switch will step repeatedly until the circuit is broken. This is effected by a stopper relay STCR (202) which is connected to the wiper 700 of stepper bank 1ESS–C. The #4 contact of this bank is connected by a wire 707 to the wiper of stepping switch bank TSS–A (197). The #1 to #6 contacts of this bank are connected to wires 615–620 of the decoder which represent numerical values 1–6. Hence, one of the wires corresponding to the number of the tool desired will be grounded through the decoder and, when the wiper of the stepping switch bank TSS–A encounters the grounded contact, the stopper relay STCR will be energized. It will thereupon open its contacts in line 207 and prevent further stepping of switch TSS.

The wiper of stepping switch bank TSS–B (247) will be moved to a corresponding position and thereby ground the wipers of a group of selector switches 4SEL, 5SEL, 6SEL or 7SEL associated with a particular tool. The selector switches for the #6 tool (254) are fully detailed while the switches for tools #1–5 in lines 248–252 respectively are shown in block outline only, it being understood that the switches shown in lines 248–252 are identical in every respect to the switches shown in line 254. It is also to be understood that contacts numbered 0–9 of each selector switch are connected with the corresponding contacts of the switches above and below it as indicated by the vertical lines extending upwardly from the contacts of the switches shown in line 254. The contacts of switches 4SEL to 7SEL are also connected to the corresponding contacts of stepping switch banks 2SS–A, 3SS–A, 4SS–A and 5SS–A, respectively. Hence, one contact of each of the stepping switch banks will be grounded in accordance with the setting of its associated switches selected by the stepping switch TSS. Accordingly, when contacts 37CR (255) are closed, the stepping switches 2SS–5SS will step until the wipers of the A banks of these steppers encounter grounded contacts. Thereupon, the stopper relays 65CR–68CR will be energized and open their contacts in lines 256, 260, 265 and 267 and break the circuit to the stepping switches. The switch banks 2SS–C, 3SS–D to G, 4SS–B and C and 5SS–B and C (FIG. 8) will now be positioned in accordance with the settings of selector switches 4SEL–7SEL for the selected tool. The tool length stores will thus be set to position the selected tool at a predetermined height above the surface of the workpiece and thereby permit the latter to be moved into position for the next operation.

Provision is also made for manual selection of a particular tool length store so as to permit the selector switches 4SEL–7SEL thereof to be preset in accordance with the different lengths of the tools carried in the turret. For this purpose, a tool selector switch 2SEL (200) has its wiper connected to the #4 contact of stepping switch bank 1ESS–B. The wiper 709 for the latter bank is connected through contacts 9CR and 3CR (199) to the conductor 100. Therefore, when the machine is conditioned for either a pre-cycle or manual type of operation, the setting of selector switch 2SEL determines which contact of bank TSS–A is grounded. Stepping switch TSS will thus be deenergized through the energization of stopper relay STCR when it reaches the contact corresponding to the setting of selector switch 2SEL. Manual adjustment of the wipers of selector switches 4SEL–7SEL will cause the stepping switches 2SS–5SS to follow the movements of the selector switches and adjust the wipers of the banks of these switches shown in FIG. 8. With the tool selected set to a predetermined height above the surface of the workpiece, the selector switch associated with that particular tool may be adjusted for a minimum reading of the meter 78 (FIG. 13). This provides a convenient means for setting the selector switches to bring each tool to a predetermined height above the workpiece before an automatic cycle is begun.

When the master stepper advances to the #5 position, the tape reader clutch will be energized, and the tape will be read. If a hole is punched in track #1, relay 1CR will be energized and close its contacts in line 211. This will cause a drill relay 20CR to be energized through the wiper 704 and contacts STCR and 11CR. If instead, however, a hole is punched in track #2, the relay 2CR will be energized and close its contacts in line 213 thereby energizing a tap relay 21CR. As indicated by the dotted lines, the relays 20CR and 21CR are interlocked so that only one can be operated at a time. It is also to be noted that when the master stepper reads the tape in the #5 position, the end of cycle relay 22CR (210) will be energized providing a hole is punched in the check, or #5, track of the tape. In this case, the contacts CKCR in line 210 will be closed during the reading cycle as will also the contacts 11CR in line 207. Hence, the relay 22CR will be energized through the normally closed contacts STCR thereby opening its contacts 22CR in line 56. This will drop out the cycle relay 6CR and cause the contacts 6CR in line 77 to open thereby preventing further reading of the tape.

Passing over for the moment the functions of contacts #6–#15 of the master stepper, the means for filling the hole depth store will now be described. The units digit of the store is filled under the control of stepping switch 6SS (215) which is connected to contact #16 of stepping switch bank 1ESS–D. The wiper 704 (207) of this bank is connected through stopper contacts STCR and parity check contacts 11CR to the conductor 100. Hence, when the wiper 704 moves onto contact #16, the stepping switch 6SS will be energized through its own interrupter contacts 6SS–1 and will step ahead. At this time, the wiper 700 (202) of the bank 1ESS–C will also be on the #16 contact of its bank which, as shown, is connected to the wiper of the stepping switch bank 6SS–A (216). Hence, if it be assumed that holes are punched in the #1 and #2 tracks of the tape, the #3 contact of bank 6SS–A will be grounded through the decoder, and the stopper relay STCR will be energized when the wiper 700 reaches this contact. Thereupon, the contacts STCR (207) will open and break the circuit through wiper 704 to stepping switch 6SS and stop further stepping of the switch. Thus, the wiper of bank 6SS–C (FIG. 11) will be moved to the same position. The stepping switches 7SS, 8SS and 9SS for the tenths, hundredths and thousandths digits of the hole depth data, impressed on the three lines on the tape corresponding to the 17, 18 and 19 positions of the master stepper, are similarly filled. That is, in the 17th position, the stepping switch 7SS (218) is stepped until the relay STCR is energized by the grounded contact of bank 7SS–A (219). In the 18th position, the stepping switch 8SS (225) is stepped until the relay STCR is energized by the grounded contact of bank 8SS–A (226). In the 19th position, the stepping switch 9SS (227) is stepped until the relay STCR is energized by the grounded contact of bank 9SS–A.

Positions 20 and 21 of the master stepper are assigned to the spindle speed store. Thus, if a spindle speed from 1 to 9 is desired, the line of tape corresponding to the #20 position of the stepper is provided with a parity check punch only in track #5. If, on the other hand, a spindle speed of from 10 to 16 is wanted, a hole is punched in the #1 track in this line of tape, and appropriate holes are punched for the numerical values of 0 to 6 in the next line of the tape. The presence of a "1" punch will cause relay 1CR to be energized and close its contacts in line 229. The #20 contact of bank 1ESS–D, it will be recalled, is grounded by wiper 704 (207) through contacts STCR and 11CR. A relay C1CR (229) has one side thereof connected through the now closed contacts 1CR to contact #20 and the other side connected to a wire 461 which is connected to contacts 20 and 21 of bank 1ESS–A (150). Since the wiper of the latter bank is connected to the conductor 448, relay C1CR will be energized and close its contacts in line 228. This will establish a ground for relay C1CR and hold the relay energized in positions 20 and 21 of the master stepper. Diode 415 is provided to prevent grounding of stopper relay STCR through the 1CR contacts in line 229.

When the stepper advances to the next position, the wiper 704 (207) of bank 1ESS–D will provide a ground for a stepping switch C2SS (231) which is connected through its interrupter contacts C2SS–1 to the conductor 448. The switch will thereby step and advance the wiper of contact bank C2SS–A (232) which is connected to contact #21 of bank 1ESS–C. The wiper 700 (202) of this bank is connected through stopper relay STCR to conductor 448. Hence, when the wiper of bank C2SS–A reaches a grounded contact, the relay STCR will be energized and break the ground connection for stepping switch C2SS. If relay C1CR is deenergized, numerical data from 1 to 9 on the tape will ground one of the conductors 615 to 623 through the decoder and cause the wiper to stop on the corresponding contact of bank C2SS–A. If relay C1CR is energized in the manner described above, its contacts in line 233 will be operated and change the connection between the wires 615–620 and the contacts of bank C2SS–A. Numerical data from 0–6 encoded on the tape will now ground contacts 10–16 of this bank and cause selection of the corresponding spindle speeds. It will be noted that if a "0" is encoded on the tape without a "1" punch in the preceding line, contacts 17 of the bank will be grounded thereby causing clutches 5CL and 6CL to be energized and brake the spindle.

Positions 22 and 23 of the master stepper are used for filling the spindle feed store. This store includes two stepping switches C3SS (242) and C4SS (245) which are connected to the #22 and #23 contacts, respectively, of the bank 1ESS–D. Bank C3SS–A (243) and C4SS–A (246) of the switches are connected to the #22 and #23 contacts, respectively, of bank 1ESS–C. Hence, when the wipers 704 and 700 are on the #22 contacts of their respective banks, the stepping switch C3SS will move to a contact corresponding in value to the 10's digit encoded on the tape. Likewise, when the wipers are on the #23 contacts, the stepping switch C4SS will move to a contact which corresponds in value to the units digit encoded on the tape.

Referring again to the means for advancing the master stepper from one contact to the next, when the wiper 555 of bank 1ESS–E (71) is on contact #4 as shown, it will remain in this position until the tool selector store is filled as signified by the energization of stopper relay STCR (202). When this occurs, contacts STCR in line 65 will close and energize the master stepper 1ESS (73) through line 556 and contacts 11CR (63). The interrupter contacts 1ESS–1 (73) will open and deenergize relay 11CR (101) thereby deenergizing the stepper coil and permitting the stepper to move its wipers onto the #5 contacts. The #5 contact of bank 1ESS–E (71) is connected to wire 556 through the normally open contacts 20CR and 21CR so as to cause the stepper to be energized through the contacts 11CR (63) and advance to the #6 contact since one of the contacts 20CR and 21CR is always energized. The next 10 contacts, i.e., contacts 6–15, are associated with the table stores, there being five contacts provided for each axis, the contacts 6–10 being assigned to the tens, units, tenths, hundredths, and thousandths digits for the X-axis, and the contacts 11–15 being assigned to the corresponding digits for the Y-axis. Contacts 6–14 are each connected to a wire 557 which, in turn, is connected to wire 556 through the normally open contacts of relay STCR in line 65 so that stepping of the switch from one contact to the next will occur only after the stepping switch store associated therewith has been filled. The stepping switch stores for these axes are arranged and function in the same manner as the hole depth stepping switch stores heretofore described and require no further explanation.

When the wiper 555 steps onto contact #15 of bank 1ESS–E, it will remain in this position until the tool has left the hole and movement of the table is indicated by closure of at least one of the Micropositioner contacts 50CR, 51CR, 52CR and 53CR (144–147). Relay 30CR (145) will thereby be energized and close its contacts in line 67. If the stopper relay STCR is now energized, its contacts in line 65 will be closed, and the stepper will move to contact #16 and thereafter to contacts 17, 18, 19 and 20 each time the relay STCR is energized. In position 20, the stepper will be energized when either relay CKCR (90) or STCR (202) is energized depending on whether a parity check or a "1" is punched on the tape in this position. The stepper will be advanced by the energization of relay STCR from contacts 21–23 and will automatically advance from contact 24 to contact 25. Here the stepper must await the unshorting of the hole depth store as signified by energization of relay 32CR and the end of block signal provided by relay 10CR before it can step to contact 26 and thence automatically to contact #1 whereupon the sequence will be repeated.

A tab sequential type of coding is utilized to facilitate the handling of repetitive data. For this purpose a tab sequential stepping switch 2ESS (105) is connected to the parity check circuit so as to be energized each time a group of punches in the 2-6 tracks occur in a line of tape. When these five consecutive holes are punched in the tape, a circuit will be established from wire 578 to wire 598, and the stepper will be energized. This will close the interrupter contact 2ESS-2 of the stepper in line 141 and energize relay 17CR (142) thereby opening contacts 17CR in line 76 and deenergizing line 578 and stepper 2ESS which will then step to the next position.

In preparing the tape, a tab sequential punch must be inserted between groups of information, i.e., in the location marked "T" on bank 1ESS-F (140) of the master stepper. In all, there are seven tabs for each block of information so that normally each block requires 7+25 or 32 lines of taped information. The stepper 2ESS is provided with a bank 2ESS-B (136) having ten contacts which are connected to the contacts of bank 1ESS-F in the manner shown in the diagram. Thus, when the tape reaches the first tab, i.e., the rightmost tab indicated in the diagram, the wiper 626 will be on contact #4 since it advanced one step when a parity check was read on the third line of tape with the wiper on contact #3. Hence, stepper 2ESS will be actuated by the tab punch, and the wiper 572 of bank 2ESS-B will advance to contact #1 but the master stepper will not advance and the stores will not be filled (see 11CR contacts in line 207) since the parity check relay 11CR will not be energized by the five punches in the #2 to #6 tracks, and, hence, the 11CR contacts in line 207 will remain open. The same action will occur when the second tab is read with the wiper 626 (140) on the #6 contact, and the wiper 572 (136) will be advanced to the #2 contact. Hence, the tab sequential stepper will follow directly behind the master stepper due to the tab punch between each group of contacts on the master stepper 1ESS.

Whenever a word in a block of information is being repeated, i.e., it is the same as in the preceding block, a second tab punch may be inserted in place of the repeated information and the master stepper will skip onto the next word and allow the store associated with the skipped word to remain at its previous setting.

For example, if the tool selection is to be the same, a second tab punch may be inserted between contacts 3 and 4 and the wiper 572 will step onto contact #2 during the second tab. This will establish a circuit from conductor 448 through stepper 1ESS, wire 555', diode 416 (137), wiper 626, wire 629, wiper 572, wire 572', and interrupter contacts 1ESS-1 (73) to conductor 100. The stepper will therefore automatically step ahead until wiper 626 moves to contact #6 when the circuit will be broken and the stepper will stop. At the same time a circuit will be established from conductor 448 through relay 16CR (141), wiper 626, wire 629, wiper 572, wire 572' to contacts 1ESS-1 (73) and conductor 100. Hence, relay 16CR will be energized and close its contacts in line 142 thereby energizing relay 17CR. This will open contacts 17CR in line 76 and prevent operation of the reader, the buffer stores and the parity check circuit. Although relay 16CR will be momentarily deenergized each time the stepper 1ESS steps, the relay 17CR will be held in by the charge stored in capacitor 417. Diodes 416 and 418 (141) are for the purpose of preventing misoperation of stepper 1ESS and relay 16CR by transient impulses.

Hence, by the use of the tab sequential system, the preparation of the tape is simplified and the time required to read the tape and fill the stores is reduced where part of the information is being repeated.

As hereinbefore noted, the movement of the drill spindle along the Z axis is controlled by the pacer motor 49 and clutch 52 (FIG. 12). The logical control of these elements is effected by the relay circuits shown in the wiring diagram and includes the relays ZFCR (48) and ZACR (49) along with the relays and circuits shown in FIGS. 14f and 14g of the drawings. The relay ZACR is controlled by the contacts 70CR of the coarse error signal relay which, as heretofore mentioned, is included in the error amplifier 75 (FIG. 13). The contacts 70CR will open and drop out relay ZACR when the tool is within ½ inch of its final position. The relay ZFCR is controlled by the contacts 71CR of a fine error signal relay which is likewise a part of the error amplifier. The contacts 71CR will open and drop out relay ZFCR when the tool is within say .100 of an inch of its final position. Hence, the dropping out of relays ZACR and ZFCR signals the approach of the tool to the position indicated by the data contained in the stores.

It is to be noted that the error amplifier always "sees" either the upper limit, the top of the hole, or the bottom of the hole. By the upper limit is meant the position defined by the setting of potentiometer 318 (FIG. 13). By the top of the hole is meant the position defined by the tool length store, i.e., the surface of the workpiece plus a predetermined distance say, for example, .050 of an inch. However, the drill head can only move when the pacer clutch 52 is energized and this, as well as the direction of rotation of the pacer motor, is controlled by the logic of the relay circuits.

It is also to be noted that the error amplifier 75 has no sense of direction. It merely detects the amplitude of the error signal. The direction of travel of the drill head or slide 62 is entirely under the control of the relay circuit. The Micropositioner 82, however, does have direction sense, but, in the Z-axis control, this is used only to the extent of determining which Micropositioner contact shall be effective to deenergize the pacer clutch. One of these contacts is effective when the head is traveling up, and the other is effective when the head is traveling down. Considering, now, the control relays and their specific functions, the relay 19CR (143) is connected by a wire 641 with the #16 contact on bank 1ESS-A (150) and, therefore, at the start of a new automatic cycle, will remain deenergized until the master stepper advances from contact #15 to #16. This occurs when relay 30CR (145) is energized and closes its contacts in line 67. Since this relay is connected by a wire 651 with the #15 contact of bank 1ESS-A it can only be energized with the master stepper in this position and with a change of table position indicated by the closure of at least one of the Micropositioner contacts 50CR–53CR. Also, the tool must be out of the hole thereby closing contacts 34CR in line 145.

The tool change relay TCCR (151) is energized by the closure of the interrupter contacts TSS-1 (151) whenever the stepping switch TSS moves to a different contact. The holding contacts TCCR (152) will then close and hold the relay energized as long as one or more of the contacts 36CR (24) and 65CR–68CR (25–28) remain closed.

When relay 32CR (153) is energized it unshorts the hole depth store so that the error amplifier will "see" the bottom of the hole. Since this relay is connected by a wire 778 with contacts 24 and 25 on bank 1ESS-A (150) it can only be energized in these positions of the master stepper. Also, it can only be energized when pressure has been restored to line 160 (FIG. 3) thereby closing contacts 1PS (153); when contacts ZFCR and ZACR are closed by a correct positioning of the drill head, when contacts TCCR are closed as a result of no tool change or by the completion of a tool change; when contacts 36CR and 33CR are closed; when "Auto" contacts 18CR or "Manual" contacts 3CR are closed, and when Micropositioner contacts 50CR–53CR are all closed due to correct positioning of the table. Once energized, relay 32CR will remain energized until contacts ZFCR, ZACR or 54CR (156–158) open at the bottom of the hole.

When relays 32CR and 54CR (FIG. 13) are energized, the relay 33CR (159) will be energized signifying that the tool is feeding down into the hole. Once energized, it will be held energized until relay 34AXCR (162) is energized at the bottom of the hole.

Relays 34CR and 34AXCR (161, 162) are energized when 32CR is deenergized, and the error amplifier "sees" the top of the hole. Relay 34AXCR is provided with form "D" contacts, i.e., the normally open contacts of this relay will "make" before the normally closed contacts thereof "break." Therefore, the contacts of relay 34 AXCR in line 161 will close before the contacts of this relay in line 160 open so that relay 34CR is energized before relay 33CR is deenergized. Relays 32AXCR (156) and ZFCR (48) also have form "D" contacts.

Relay 35CR (164) is energized when relay 37CR is deenergized to signal movement of the drill head toward the upper limit and remains energized until the drill moves down into the next hole as indicated by the energization of relay 32AXCR and opening of its contacts in line 164.

Relay 4CCR (167) is energized as the tool approaches the bottom of the hole in a drill cycle and reduces the feed to a creep speed from the point of dropout of relay ZFCR to the bottom of the hole where relay 54CR drops out.

Relay 2CCR (168) is energized in a drilling cycle when the tool starts out of the hole and "rapids" the tool out either to the top of the hole or to the upper limit when a tool change is signaled. This relay is also effective to "rapid" the tool back to the top of the hole from the upper limit.

Relay 3CCR (170) reverses the direction of the pacer motor at the bottom of the hole in a drill cycle thereby reversing the movement of the drill head. In a tap cycle this is not necessary since the spindle motor is reversed at the bottom of the hole, thereby also reversing the pacer motor.

Relay 36CR (176), when energized, indicates that the turret is in the position called for by the stepping switch TSS. Relays 38CR (186) and 39CR (187) control the energization of relay 36CR in accordance with the position of limit switches 1LS and 2LS (see also FIG. 3).

Relay 37CR (183) is deenergized to move the head to the upper limit and energized to move it back down to the workpiece. This is effected by the contacts 37CR in FIG. 13 which connect either the upper limit potentiometer 318 to the coarse input to error amplifier 75, or the wire 913 from the coarse channel of the tool length and hole depth stores.

Relay 40CR (188) is energized at the top of the hole during a tap cycle and signals movement of the tap from the top of the hole and to the upper limit preparatory to a tool change.

Relay 41CR (189) is also energized during a tap cycle immediately after relay 40CR is energized and serves to prevent relay 34CR from dropping out at the top of the hole.

Relays 42CR (191) and 43CR (195) are energized for a drill cycle and a tap cycle respectively and, once energized, will remain so until the other relay is energized.

When the tool length stores are being adjusted in conjunction with the meter 78 during "Precycle," a pushbutton 340 (FIG. 13) must be held depressed to connect wire 913 to the coarse input of amplifier 75 in place of wire 907. In other words, the pushbutton has the effect of reversing the 37CR contacts in FIG. 13 so that the error amplifier will "see" the top of the hole.

A complete understanding of the functioning of the control relays during an automatic cycle can probably best be gained by following through a complete drill cycle from start to finish. Therefore, it will be assumed that the drill head 62 is at its upper limit and that selector switch 1SEL (52) is set to "Automatic." When the "Advance Tape" pushbutton 414 (54) is depressed to energize relay 5CR and advance the tape, contacts 5CR in line 73 will close and cause homing of the master stepper 1ESS through its contacts 1ESS-1 and 1ESS-3 in line 73. An end-of-block punch is provided in track #8 prior to the first line of tape so that relay 10CR will be energized and open its contacts in line 54 to deenergize relay 5CR and stop further advance of the tape. Cycle start pushbutton 413 (56) is now depressed thereby closing the contacts 6CR in line 77 so as to start the reading cycle through contacts 1ESS-1 (73) and 17CR (76). Reading of the tape with advance of the master stepper through positions 1 to 15 will now take place in the manner previously described and information regarding tool selection, drill or tap cycle, and X-axis and Y-axis information will be read out.

It will be assumed in this example that no tool change will be required, i.e., the tool selected is the same as the tool used in the last operation. At this time, relay 35CR (164) is energized since relays 32CR, 37CR and 19CR are all deenergized. Relay 30CR (145) will also be energized due to the closure of at least one of the Micropositioner contacts 50CR–53CR (144–147) upon reading of the X and Y information. Therefore, the contacts 30CR in line 67 will close and cause stepper 1ESS to advance to the #25 contact and, in so doing, to read the Z-axis information, together with the spindle speed and spindle feed data. Energization of relay 30CR will also cause its contacts in FIG. 5 to close and initiate positioning of the table. Relay 19CR (143) is energized when stepper 1ESS arrives at the #16 contact and closes its contacts in line 183. When the table is positioned, relay 30CR will be deenergized and close its contacts in line 183. Relay 37CR is now energized and the error amplifier 75 now "sees" the top of the hole. Since relays 35CR and 37CR are energized, relay 2CCR (168) is energized thereby closing its contacts in line 193. This energizes the pacer clutch 52 (193) and the drill head now rapids down to the top of the hole. As the tool approaches the top of the hole, relay ZACR will drop out and cause relay 32CR (155) to be picked up by a circuit starting with conductor 100 (157), contacts 33CR (157), contacts 54CR and 42CR (158), contacts 35CR (155), and contacts ZACR (153), TCCR, 30CR, 33CR, etc. When relay 32CR is picked up, it will operate its ten pairs of contacts in FIG. 13 and "unshort" the hole depth store so that the error amplified will now "see" the bottom of the hole. Energization of relay 32CR will also cause its contacts in line 164 to open. Thereupon relay 32CR will drop out and open its contacts in line 170 thereby deenergizing relay 2CCR. Hence, the drill will now start into the hole at the selected feed rate.

Energization of relay 32CR causes its contacts in line 159 to close and energize relay 33CR. Also, contacts 32CR in line 66 will close and, since this is the end of a block of information, the contacts 10CR in line 65 will also close. The master stepper will then move to position #26 and thence to positions 1 to 15 so that the tool selection, type of cycle, and X-axis and Y-axis information for the next hole will be read into the stores as the tool is entering the present hole. When the tool reaches the bottom of the hole, relay 32CR will be deenergized due to the opening of contacts ZACR, ZFCR and 54CR in lines 156–158. Thereby, contacts 32CR in line 161 will close, and, since contacts 33CR in line 162 are closed, relay 34CR will be energized and "make" its contacts in 161 before the contacts 33CR in line 162 are broken by the opening of the contacts 34CR in line 160.

When relay 34CR is energized, its contacts in lines 170 and 173 will close thereby energizing relays 2CCR and 3CCR through the closed contacts 42CR in line 173. This reverses the direction of the pacer motor and rapids the tool out of the hole. Energization of the pacer clutch is effected through contacts 37CR (193), 55CR (194) and 2CCR (193) and upward movement of the tool will continue until the pacer clutch is deenergized by the opening of contacts 55CR in line 194.

If no tool change was indicated when the tool selection data was read, the contacts TCCR in line 183 will remain closed and relay 37CR will remain energized. Hence, the error amplifier 75 will "see" the top of the hole and relay 34CR will be deenergized when the tool reaches this position. Had a tool change been indicated, relay 37CR would have been deenergized at the bottom of the hole by the opening of contacts 34CR (184) thereby causing the error amplifier to "see" the upper limit. In this case, relay 34CR would remain energized and cause rapid return of the slide to the upper limit.

In either case, when relay 34CR is deenergized, its contacts in line 145 will close thereby energizing relay 30CR provided table movement is indicated by the closure of at least one of the contacts 50CR–53CR (144–147). When relay 30CR is energized, its contacts in line 67 will close and advance the master stepper to positions 16 to 25 thereby filling the Z-axis store, the spindle feed store and the spindle speed store. Also, the contacts 30CR in FIG. 5 will close and energize the solenoid valves to cause positioning of the table. After the table has been positioned with the tool at the top of the hole, relays contacts 50CR–53CR in line 144–147 will open and deenergize relay 30CR. These same contacts in line 153 will close and energize relay 32CR thereby "unshorting" the store and causing the error amplifier to "see" the bottom of the hole and to feed the tool down into the hole.

If a tool change is indicated, closing of contacts 34CR (29) at the upper limit will cause the tool index relay 105CR to be energized with consequent unclamping of the turret and indexing of the selected tool into operative position. With the new tool in position, relay 36CR (176) is energized thereby opening its contacts in line 24 and deenergizing relays TCCR and 105CR. The turret will thereby be clamped in the new position.

Table positioning at the upper limit will be effected in the same manner as at the top of the hole. In other words, when relay 34CR drops out, it will energize relay 30CR and close contacts 30CR in FIG. 5. After the table has been positioned, relay 30CR will drop out and close its contacts in line 183 thereby energizing relay 37CR when the contacts TCCR in line 183 close at the conclusion of the turret indexing operation. When relay 37CR is energized, the error amplifier will "see" the top of the hole and will rapid the head down whereupon relay 32CR will be energized and feed the tool into the hole as before.

When a hole is punched in the parity check column in the fifth line of tape, relay 22CR (210) will be energized as the tool is entering the last hole. This will cause relay 6CR to be deenergized and open its contacts in line 77 thereby preventing further reading of the tape. Machining of the hole proceeds, however, in the normal manner to the bottom of the hole where relay 32CR drops out thereby energizing relay 34CR and deenergizing relay 33CR. If it is a drill cycle, the closed contacts of relay 42CR in line 173 and of relay 34CR in lines 173 and 170 cause relays 2CCR and 3CCR to be energized. Hence, the tool is caused to rapid out of the hole. When the tool reaches the top of the hole with no tool change indicated, relay 34CR will drop out and open its contacts in line 170. This drops out relay 2CCR and opens its contacts in line 193 thereby deenergizing the pacer clutch. At this time, contacts 6CR in line 182 will be open so that relay 37CR also will be deenergized when relay 34CR is deenergized and opens its contacts in line 185.

If desired, the drill head now can be raised to the upper limit by turning selector switch 1SEL to "Precycle" and depressing the "Rapid Up" pushbutton (168). Since relay 37CR is now deenergized, the error amplifier "sees" the upper limit and contacts ZACR in line 195 are therefore closed while the ZACR contacts in line 30 are open. Hence, the pacer clutch will be energized and rapid the head to the upper limit. When the head reaches this position, the light 4T (30) will glow and the "Rapid Up" pushbutton may then be released.

As previously described herein, when a hole in punched in the #2 track in the fifth line of a block of tape, relay 21 will be energized and select a tap cycle. Since relays 20CR and 21CR are interlocked, when a tap cycle is selected, no further programming of this cycle is necessary. In other words, the machine will remain set for tapping until a drill cycle is programmed, and this cycle, in turn, will remain effective until a tap cycle is selected. A tool change must, of course, always accompany a change from a drill cycle to a tap cycle, or vice versa.

Operation of relay 21CR will occur in the fifth position of the master stepper and once operated it will be mechanically held in this condition until relay 20CR is energized. Since, at this time, the tool is going down into the hole, no change should be effected until this operation has been completed. It will be recalled that relays 42CR and 43CR are electrically interlocked by means of the normally closed contacts of each relay in the holding circuit of the other relay. The drill relay 42CR will therefore remain energized until the tap relay 43CR is picked up. Although relay contacts 21CR in line 195 and contacts TCCR in line 188 are now closed, relay 43CR will not be energized since contacts 37CR in line 191 are open. Relay 37CR will drop out at the bottom of the hole when contacts 34CR in line 184 open but at this time the contacts 34CR in line 191 will open and prevent energization of relay 43CR. Since relay 37CR is deenergized, the error amplifier will "see" the upper limit and will rapid up to this position where relay 34CR will drop out and energize the tap relay 43CR and deenergize the drill relay 42CR.

As previously described, deenergization of relay 34CR will initiate turret indexing by closure of its contacts 34CR in line 29 with consequent energization of relay 105CR. After the selected tap has been brought into operative position and the table movement, if any, has been effected, relays 30CR and TCCR will be deenergized and cause relay 37CR to be energized. The error amplifier will "see" the top of the hole and rapid traverse will be selected by the closure of contacts 37CR in line 175 and 35CR in line 170. The contacts 2CCR in line 193 will close and the head will rapid down to the top of the hole where relay 32CR will be energized and drop out relay 35CR. Thereby the rapid traverse relay 2CCR will be deenergized and the error amplifier will "see" the bottom of the hole. The tap will now feed down into the hole at the selected feed rate. At the bottom of the hole relay 32CR will be deenergized and "show" the error amplifier the top of the hole and relay 34CR will be energized and close its contacts in line 23. This will energize relay 103CR and reverse the spindle motor. Since this also reverses the pacer motor, it is not necessary to operate relay 3CCR at the bottom of the hole in tapping operations. Since contacts 42CR and 40CR (173, 174) are open, relay 2CCR will not be energized, and the drill head 62 will be moved up at a feed rate to the top of the hole. The table will now be positioned for the next hole to be tapped, and the operation will be repeated.

When a tool change is indicated by the energization of relay TCCR as the tap is entering its last hole, a new sequence is selected which will cause the tap to move out of the hole at a feed rate until it is clear of the work when it will rapid to the upper limit where indexing of the turret will take place in the usual manner. This sequence is brought about as follows: When the tool reaches the bottom of the hole, relay 32CR will drop out and "show" the error amplifier the top of the hole. Relay 34CR is then picked up, and the contacts 34AXCR in line 186 will close but relay 40CR will not be energized since contacts ZACR and ZFCR (188) are now open. Relay 37CR will not drop out at the bottom of the hole in the normal manner because contacts 40CR and 43CR in line 185 are both closed. Hence, the error amplifier will "see" that the top of the hole and the drill head will move up to this position at a feed rate. When the tool reaches the top of the hole, relay 34CR will not drop out because the contacts 43CR, TCCR, 41CR and 34CR in line 160 are all closed and provide a holding circuit around the contacts ZACR (161). Therefore, relay 40CR will pick up at the top of the hole when contacts ZACR and ZFCR (188) close due to deenergization of their respective relays. The contacts 40CR (189) will then close around these contacts to hold relay 40CR energized as the slide moves from the top of the hole to the upper limit. Contacts 40CR in line 185 will now open and drop out relay 37CR which "shows" the error amplifier the upper limit. This will cause contacts ZACR (189) to close and energize relay 41CR which causes contacts 41CR in line 160 to open. However, the contacts ZACR in line 161 are now closed, and relay 34CR will remain energized. When contacts 40CR in line 174 close, relay 2CCR is energized and the slide is moved in rapid traverse from the top of the hole to the upper limit. Here, relay 34CR will be deenergized and initiate the tool indexing operation. If a drill cycle was selected in conjunction with the tool change, relay 42CR will be energized upon the closure of contacts 34CR in line 191 and relay 43CR will be deenergized.

As previously mentioned, when tapping a hole the spindle motor reverses at the bottom of the hole and thereby reverses the pacer motor. Hence, it is not necessary to operate relay 3CCR to move up out of the hole. When a left hand tap is being used, however, the switch 409 (9) is set for "Reverse" and relay MR is energized thus closing its contacts in lines 3 and 4 and reversing the spindle motor. This will cause the pacer motor to run in a direction to elevate the head. Since, in entering a hole, contacts 32CR (172) are closed and contacts MR (171) are also closed, relay 3CCR will be energized and reverse the pacer motor to move the head down. At the bottom of the hole, relay 32CR will drop out, and relay 34CR will pick up and close its contacts in lines 173 and 23. Relay 103CR is thereby energized causing relay MF to be energized and close its contacts in line 170. The spindle motor will be reversed thereby reversing the pacer motor. Accordingly, it is necessary to maintain relay 3CCR energized in order to move the head up out of the hole. This is effected by the contacts 43CR in line 171 and 34CR in line 173 which, through the contacts MF in line 170 maintain relay 3CCR energized.

While in the foregoing description the invention was explained in connection with one possible form or embodiment thereof wherefore certain specific terms and language have been used herein, it is to be understood that the present disclosure is illustrative rather than restrictive and that changes and modifications may be resorted to without departing from the spirit of the invention as defined by the claims which follow.

What is claimed is:

1. A numerical control system for moving a machine tool slide having a plurality of selectable tools thereon from a given starting position to a plurality of moved positions comprising a digital-to-analog converter common to all of said tools, means including a plurality of manually settable switches associated with each of said tools for deriving from said converter an output voltage which is definitive of the moved position of its associated tool, means to select one of said tools and its associated switches, manually controlled means for moving the selected tool to its moved position, means for adjusting the selected switches with the tool associated therewith in its moved position until the output voltage of said converter corresponds to the moved position of the tool, and means connected to said slide and responsive to the output voltage from said converter for moving the selected tool from its starting position to its moved position.

2. The numerical control system of claim 1 wherein said adjusting means includes a device for continuously indicating the difference between the output voltage of said converter and a voltage corresponding to the moved position of the tool.

3. In a numerically controlled turret drill having a work support, a tool support mounted for movement relative to said work support from a starting position to a work-engaging position, an indexable turret on said tool support, and a plurality of tool spindles on said turret for holding tools of different lengths, the combination of a digital-to-analog converter common to all of said tool spindles, means including a plurality of manually settable switches associated with each of the tool spindles for deriving from said converter an output voltage which corresponds to a work-engaging position of said tool support, means to select one of said tool spindles on said turret and its associated switches, means for adjusting the switches associated with the selected tool spindle to derive from said converter an output voltage which corresponds to the work-engaging position of its associated spindle, and means responsive to the output voltage from said converter for moving the tool support from its starting position to the work-engaging position for the selected tool spindle.

4. The numerical control system of claim 3 including a second-digital-to-analog converter, a means associated with said second converter for deriving therefrom an output voltage which is an analog of the depth of the hole to be machined in the workpiece, and means rendered effective by the movement of the tool support from its starting position to the work-engaging position of the selected tool spindle for adding to the output voltage of the first-mentioned converter that derived from the second converter whereby said moving means will advance the tool spindle from its work-engaging position to the bottom of the hole.

5. The numerical control system of claim 4 including means responsive to the arrival of the tool spindle at the bottom of the hole for removing the output voltage derived from said second converter whereby said moving means will withdraw the tool spindle from the hole.

6. The numerical control system of claim 4 including a source of off-set voltage which is an analog of a preselected distance above the surface of the work, means to connect said source of offset voltage in series with the output from said first-mentioned converter during adjustment of each tool length store, and means to disconnect said source of offset voltage when the output voltage from said second converter is added to that from said first-mentioned converter.

7. A stored information system for controlling at least two sequential operations of a machine tool comprising a tape reader for reading out each line of data from a block of information on a tape, a store associated with each operation for receiving the data pertaining to its related operation as it is read from the tape, a cyclically operable distributor for causing the information to be read from the tape and entered into the proper store, separate means associated with each of said operations for signifying the occurrence of its related operation, and means controlled by the signifying means for one operation to initiate reading by the distributor of the data pertaining to the other operation and to enter it into the related store, whereby, while one operation is being performed under the control of its associated store, the store associated with the other operation is being filled, and vice versa.

8. In a feed mechanism for a machine tool having a work support, a tool support movable relative to said work support, a tool spindle journaled on said tool support, a spindle drive motor, and means for driving said spindle from said motor, the combination of a tachometer driven by said spindle motor to produce an output voltage proportional to the speed of said spindle drive motor, a feed store including a digital-to-analog converter energized by said output voltage for providing a plurality of selectable feed voltages, and means controlled by a selected feed voltage for moving said tool support at a rate proportional to said feed voltage whereby the distance moved by the tool support per revolution of the spindle will remain constant despite changes in speed of the spindle drive motor.

9. The feed mechanism of claim 8 wherein said digital-to-analog converter includes a tapped autotransformer energized by said output voltage, and a numerically controlled stepping switch for deriving selected feed voltages from the taps of said autotransformer.

10. The feed mechanism of claim 8 wherein said spindle drive motor is selectively operable at either a high speed or a low speed, a compensating transformer adapted to maintain the feed voltage the same for both high speed and low speed operation of the motor, including a winding tapped to provide a turns ratio equal to the high speed to low speed ratio of the motor, and means for selecting the appropriate portion of the winding with the high speed or low speed operation of the spindle drive motor to maintain the feed voltage the same for either motor speed.

11. The feed mechanism of claim 8 wherein said moving means includes a pacer motor operated by said feed voltage, and a servomechanism for said tool support driven by said pacer motor.

12. The feed mechanism of claim 11 including a tachometer driven by said pacer motor, and means for comparing the voltage produced by said tachometer with said feed voltage and applying the voltage difference to said pacer motor to cause said motor to operate at a speed proportional to the amplitude of said feed voltage.

13. A positioning system for moving a machine tool slide from one position to another position comprising a servomechanism for moving said slide, a pacer motor, a clutch operable to connect said pacer motor to the input of said servomechanism when the clutch is energized, a position store providing an output voltage which is an analog of the distance from said one position to said other position, means, including a feedback unit driven by said slide, for receiving said output voltage and producing an error voltage representative of the distance o fsaid slide from said other position, an energizing circuit for said clutch, and means controlled by said error voltage for deenergizing said clutch when said slide has reached said other position.

14. The positioning system of claim 13 including a voltage source for providing a feed voltage to operate said pacer motor, and means driven by said pacer motor for causing it to run at a speed proportional to the amplitude of said feed voltage.

15. An apparatus for moving a machine tool element in rapid traverse from an initial position to a selected work-engaging position, and then at a feed rate to a selected final position, comprising a first adjustable means for producing a first voltage representative of said selected work-engaging position of said element, a second adjustable means for producing a second voltage representative of the distance from said selected work-engaging position of said element to said selected final position thereof, means controlled by said voltages for driving said element to positions corresponding to those represented by said voltages, means for governing the operation of said driving means to effect either feeding or rapid traverse movement of said element, means for selectively applying said first voltage to said driving means and causing said governing means to effect rapid traverse movement of said element from said initial position to said selected work-engaging position, and means rendered effective as said element approaches said selected work-engaging position for causing said second voltage to be added to said first voltage and said governing means to effect feeding movement of said element from said selected work-engaging position to said selected final position.

16. The positioning and feeding apparatus of claim 15 wherein said first adjustable means includes manually settable means for receiving tool length information, and said adjustable means includes automatically settable means for receiving numerical input data from a record medium.

17. The positioning and feeding apparatus of claim 15 including a third adjustable means for producing a third voltage representative of said initial position of said element, and selectively operable means for applying said third voltage to said driving means and causing said governing means to effect rapid traverse movement of said element to said initial position.

18. An apparatus for moving a machine tool slide having a plurality of selectable tools thereon from an initial position to a plurality of different work-engaging positions comprising a first source for producing a plurality of voltages each representative of a different work-engaging position of said slide, presettable means associated with each of said tools for deriving from said first source a voltage representative of the work-engaging position of its associated tool, means to select one of said tools and its associated presettable means for operation, a second source for producing a voltage representative of the initial position of said slide, means controlled by the voltages from said first and second sources for driving said slide to the positions represented by said voltages, and selectively operable means for applying the voltages from one or the other of said sources to said driving means to thereby cause the slide to be moved from its initial position to a selected work-engaging position and vice versa.

19. The slide moving apparatus of claim 18 including means for governing the operation of said driving means to effect either feeding or rapid traverse movement of said slide, and means for causing said governing means to effect rapid traverse operation of said slide as it moves from its initial position to the selected work-engaging position.

20. An apparatus for moving a machine tool slide having a plurality of adjustable tools thereon from an initial position to a plurality of different work-engaging positions comprising a first source for producing a plurality of voltages each representative of a different work-engaging position of said slide, presettable means associated with each of said tools for deriving from said source a voltage representative of the work-engaging position of its associated tool, means to select any one of said tools and its associated presettable means for operation, a second source for producing a voltage representative of the distance from the work-engaging position of the slide to the final position thereof, means controlled by said voltages for driving said slide to positions represented by the voltages from said sources, and means rendered effective as said slide approaches the selected work-engaging position for causing the voltage from said second source be added to that from said first source whereby said driving means will move said slide to its final position.

21. An apparatus for moving a machine tool slide having a plurality of selectable tools thereon from an initial position to a plurality of different work-engaging positions comprising means for providing electrical signals representative of the different work-engaging positions of said slide, means associated with each of said tools for deriving from said first-mentioned means a signal representative of the work-engaging position of its associated tool, means to select one of said tools and its associated signal deriving means for operation, and means controlled by the signal derived from said first-mentioned means in response to the selection of said tool and its associated signal deriving means for moving said slide to the work-engaging position of said tool.

22. An apparatus for moving a machine tool slide having a plurality of selectable tools thereon from an initial position to a plurality of different work-engaging positions comprising a source of electrical signals representative of the different work-engaging positions of said slide, settable means associated with each of said tools for deriving from said source a signal representative of the work-engaging position of its associated tool, means to select one of said tools and its associated settable means for operation, and means controlled by the signal derived from said source in response to the selection of said tool and its associated settable means for moving said slide to the work-engaging position of said tool.

23. The apparatus of claim 22 wherein said source comprises a digital-to-analog converter.

24. An apparatus for moving a machine tool slide having a plurality of selectable tools thereon from an initial position to a plurality of different work-engaging positions comprising a source of electrical signals representative of the different work-engaging positions of said slide, a plurality of manually settable switches associated with each of said tools for deriving from said source a signal representative of the work-engaging position of its associated tool, means to select one of said tools and its associated switches for operation, and means controlled by the signal derived from said source in response to the selection of said tool and its associated switches for moving said slide to the work-engaging position of said tool.

25. An apparatus for moving a machine tool slide having a plurality of selectable tools thereon from an initial position to a plurality of different work-engaging positions comprising means for providing electrical signals representative of the different work-engaging positions of said slide, means associated with each of said tools for deriving from said first-mentioned means a signal representative of the work-engaging position of its associated tool, means to select one of said tools and its associated signal deriving means for operation, means for providing an electrical signal representative of the initial position of said slide, means controlled by the signals from each of said signal providing means for moving said slide to the positions represented by said signals, and selectively operable means for applying the signals from one or the other of said signal providing means to said moving means to thereby cause the slide to be moved from its initial position to a selected work-engaging position and vice versa.

26. An apparatus for moving a machine tool slide having a plurality of selectable tools thereon from an initial position to a plurality of different work-engaging positions comprising means for providing electrical signals representative of the different work-engaging positions of said slide, means associated with each of said tools for deriving from said first-mentioned means a signal representative of the work-engaging position of its associated tool, means to select one of said tools and its associated signal deriving means for operation, means for providing an electrical signal representative of the distance from the work-engaging position of the slide to the final position thereof, means controlled by said signals for moving said slide to the positions represented by said signals, and means rendered effective as said slide approaches the work-engaging position for causing the last-named signal to be added to the first-named signal and thereby cause the moving means to move the slide to its final position.

27. In a machine tool having a turret, means for supporting said turret for movement relative to a work support, and a plurality of tools of different lengths supported on said turret for engagement with a workpiece mounted on said work support, the combination of means for indexing said turret on said supporting means to bring different ones of the tools into operative position, means for moving said supporting means and said tools from an initial position to a work engaging position wherein the tool in operative position is located adjacent the workpiece, said means including a data controlled positioning system, a plurality of storage units each adapted to receive electrical data representative of the work engaging position of one of said tools, means for conjointly selecting one of said tools and its associated storage unit for operation, and means for controlling said positioning system in accordance with the electrical data in the selected storage unit to thereby automatically determine the work engaging position of the selected tool.

28. The machine tool of claim 27 wherein each of said storage units includes a plurality of selector switches each representing one digit of a decimal member.

29. The machine tool of claim 27 including means for receiving data from a record medium and for controlling the operation of said selecting means in accordance with the data so received.

30. The machine tool of claim 27 including a plurality of storage units for receiving data representative of the distance from the work engaging position of the selected tool to the final position thereof, and means for adding the data in said first-mentioned storage units to the data in said second-mentioned storage units and applying the combined data to said controlling means to thereby automatically determine the final position of the selected tool.

References Cited by the Examiner

UNITED STATES PATENTS

| | | | |
|---|---|---|---|
| 1,968,990 | 8/34 | Carlson | 74—824 |
| 2,670,636 | 3/54 | Burg | 77—25 |
| 2,733,691 | 2/56 | Johnson | 121—45 |
| 2,759,458 | 8/56 | Robinson | 121—45 |
| 2,799,075 | 7/57 | Nichta | 77—25 |
| 2,839,711 | 6/58 | Tripp | 318—162 |
| 2,870,660 | 1/59 | Chausson | 77—32.2 |
| 2,876,650 | 3/59 | Sangster. | |
| 2,934,978 | 5/60 | Estabrook | 77—32.2 |
| 2,969,490 | 1/61 | Anderson et al. | 77—32.2 |
| 2,994,812 | 8/61 | Spencer et al. | 318—162 |
| 3,018,762 | 1/62 | Korb | 91—170 |
| 3,051,137 | 8/62 | Kutzler | 91—170 |
| 3,115,051 | 12/63 | Burg | 77—25 |

OTHER REFERENCES

"Control Engineering" Magazine, McGraw-Hill Publishing Company, pages 88–91, January 1958.

Pages 22–25 of a reprint of the "Control Engineering" article on file Group 340.

WILLIAM W. DYER, JR., *Primary Examiner.*

JOHN C. CHRISTIE, FRANK H. BRONAUGH, FRANK E. BAILEY, J. SPENCER OVERHOLSER,
*Examiners.*